(12) United States Patent
Hsiun et al.

(10) Patent No.: US 7,920,624 B2
(45) Date of Patent: Apr. 5, 2011

(54) INVERSE QUANTIZER SUPPORTING MULTIPLE DECODING PROCESSES

(75) Inventors: Vivian Hsiun, Yorba Linda, CA (US); Alexander G. MacInnis, Los Altos, CA (US); Xiaodong Xie, Fremont, CA (US)

(73) Assignee: Broadcom Corporation

( * ) Notice: Subject to any disclaimer, the term of this patent is extended or adjusted under 35 U.S.C. 154(b) by 2496 days.

(21) Appl. No.: 10/404,389

(22) Filed: Apr. 1, 2003

(65) Prior Publication Data

US 2003/0235251 A1 Dec. 25, 2003

Related U.S. Application Data

(60) Provisional application No. 60/369,217, filed on Apr. 1, 2002.

(51) Int. Cl.
*H04N 7/18* (2006.01)
(52) U.S. Cl. ......... 375/240.03; 375/240.02; 375/240.25; 375/240.26
(58) Field of Classification Search .............. 375/240.01–240.29; 348/700–729
See application file for complete search history.

(56) References Cited

U.S. PATENT DOCUMENTS

| | | | | |
|---|---|---|---|---|
| 5,610,657 A * | 3/1997 | Zhang | ...................... | 375/240.16 |
| 5,708,511 A | 1/1998 | Gandhi et al. | | |
| 5,809,270 A | 9/1998 | Robbins et al. | | |
| 5,815,206 A * | 9/1998 | Malladi et al. | ........... | 375/240.01 |
| 6,052,415 A * | 4/2000 | Carr et al. | ................ | 375/240.12 |
| 6,538,656 B1 | 3/2003 | Cheung et al. | ................ | 345/519 |
| 6,542,541 B1 * | 4/2003 | Luna et al. | ............... | 375/240.01 |
| 6,842,124 B2 * | 1/2005 | Penna | ............................ | 341/67 |
| 2001/0046260 A1 | 11/2001 | Molloy | | |

FOREIGN PATENT DOCUMENTS

EP 0663762 A 7/1995

OTHER PUBLICATIONS

Lee et al: "Data Flow Processor for Multi-Standard Video Codec", Custom Integrated Circuits Conference, 1994, Proceedings of the IEEE 1994 San Diego, CA, USA, May 1-4, 1994, pp. 103-106, XP010129914, ISBN: 0-7803-1886-2.
U.S. Appl. No. 09/437,208 entitled "Graphics Display System", filed Nov. 9, 1999, Inventor: Alexander G. MacInnis et al.
U.S. Appl. No. 09/641,374 entitled "Video, Audio and Graphics Decode, Composite and Display System", filed Aug. 18, 2000, Inventor: Alexander G. MacInnis et al.
U.S. Appl. No. 09/641,936 entitled "Video and Graphics System With an MPEG Video Decoder for Concurrent Multi-Row Decoding", filed Aug. 18, 2000, Inventor: Ramanujan K. Valmiki et al.

(Continued)

*Primary Examiner* — Andy S Rao
(74) *Attorney, Agent, or Firm* — McAndrews, Held & Malloy, Ltd.

(57) ABSTRACT

The present invention provides an apparatus for performing inverse quantization for multiple decoding standards, where the functional operations that comprise the inverse quantizer are modularly implemented and can be selectably performed. Each operation can be represented via a table entry in an associated memory area, with the functional operation being performed via reference to that table entry. Functional operations can be bypassed as needed if inverse quantization does not need to be performed on a set of data. Certain other processing operations can be performed between steps as needed to accommodate different coding standards. Macroblock data can be read from and written back to a common storage area, or a direct path is provided for writing the data directly to a subsequent inverse transform device.

11 Claims, 13 Drawing Sheets

OTHER PUBLICATIONS

U.S. Appl. No. 09/643,223 entitled "Video and Graphics System With MPEG Specific Data Transfer Commands", filed Aug. 18, 2000, Inventor: Ramanujan K. Valmiki et al.

U.S. Appl. No. 09/640,670 entitled "Video and Graphics System With Video Scaling", filed Aug. 18, 2000, Inventor: Alexander G. MacInnis et al.

U.S. Appl. No. 09/641,930 entitled "Video and Graphics System With a Video Transport Processor", filed Aug. 18, 2000, Inventor: Ramanujan K. Valmiki et al.

U.S. Appl. No. 09/641,935 entitled "Video and Graphics System With Parallel Processing of Graphics Windows", filed Aug. 18, 2000, Inventor: Alexander G. MacInnis et al.

U.S. Appl. No. 09/642,510 entitled "Video and Graphics System With a Single-Port RAM", filed Aug. 18, 2000, Inventor: Xiaodong Xie.

U.S. Appl. No. 09/642,458 entitled "Video and Graphics System With an Integrated System Bridge Controller", Inventor: Alexander G. MacInnis et al.

* cited by examiner

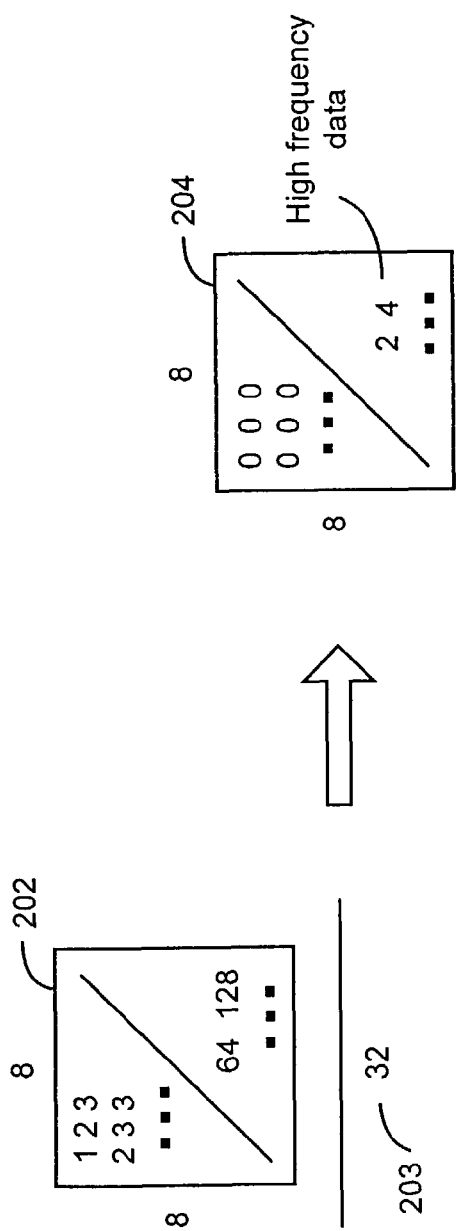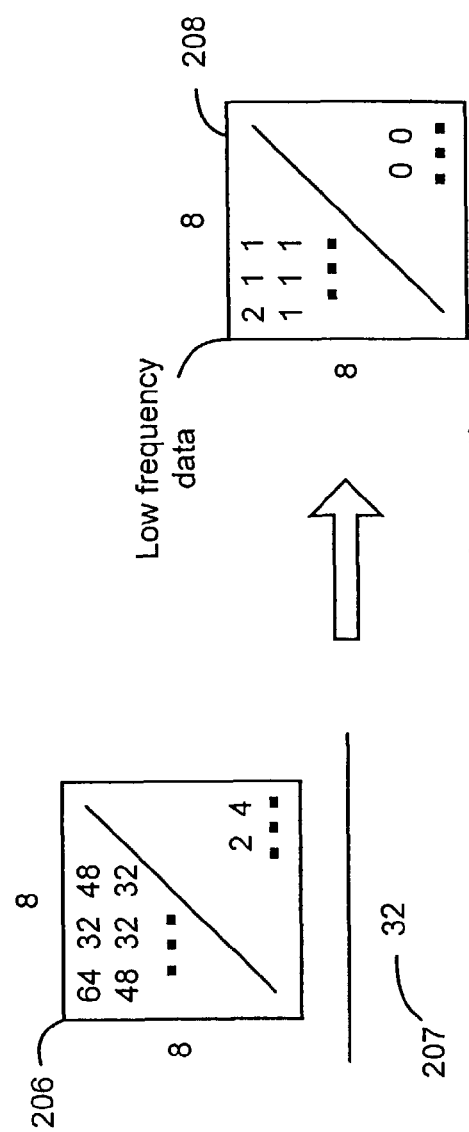

ZigZag Pattern( scan_type 0):

|   | u |   |   |   |   |   |   |   |
|---|---|---|---|---|---|---|---|---|
|   | 0 | 1 | 2 | 3 | 4 | 5 | 6 | 7 |
| 0 | 0 | 1 | 5 | 6 | 14 | 15 | 27 | 28 |
| 1 | 2 | 4 | 7 | 13 | 16 | 26 | 29 | 42 |
| 2 | 3 | 8 | 12 | 17 | 25 | 30 | 41 | 43 |
| 3 | 9 | 11 | 18 | 24 | 31 | 40 | 44 | 53 |
| 4 | 10 | 19 | 23 | 32 | 39 | 45 | 52 | 54 |
| 5 | 20 | 22 | 33 | 38 | 46 | 51 | 55 | 60 |
| 6 | 21 | 34 | 37 | 47 | 50 | 56 | 59 | 61 |
| v 7 | 35 | 36 | 48 | 49 | 57 | 58 | 62 | 63 |

Definition of scan [0][v][u]

Fig. 10

Alternate-Vertical Scan Pattern ( scan_type 1):

|   | u |   |   |   |   |   |   |   |
|---|---|---|---|---|---|---|---|---|
|   | 0 | 1 | 2 | 3 | 4 | 5 | 6 | 7 |
| 0 | 0 | 4 | 6 | 20 | 22 | 36 | 38 | 52 |
| 1 | 1 | 5 | 7 | 21 | 23 | 37 | 39 | 53 |
| 2 | 2 | 8 | 19 | 24 | 34 | 40 | 50 | 54 |
| 3 | 3 | 9 | 18 | 25 | 35 | 41 | 51 | 55 |
| 4 | 10 | 17 | 26 | 30 | 42 | 46 | 56 | 60 |
| 5 | 11 | 16 | 27 | 31 | 43 | 47 | 57 | 61 |
| 6 | 12 | 15 | 28 | 32 | 44 | 48 | 58 | 62 |
| v 7 | 13 | 14 | 29 | 33 | 45 | 49 | 59 | 63 |

Definition of scan [1][v][u]

Fig. 11

Alternate-Horizontal Scan Pattern ( scan_type 2):

|   | 0 | 1 | 2 | 3 | 4 | 5 | 6 | u 7 |
|---|---|---|---|---|---|---|---|---|
| 0 | 0 | 1 | 2 | 3 | 10 | 11 | 12 | 13 |
| 1 | 4 | 5 | 8 | 9 | 17 | 16 | 15 | 14 |
| 2 | 6 | 7 | 19 | 18 | 26 | 27 | 28 | 29 |
| 3 | 20 | 21 | 24 | 25 | 30 | 31 | 32 | 33 |
| 4 | 22 | 23 | 34 | 35 | 42 | 43 | 44 | 45 |
| 5 | 36 | 37 | 40 | 41 | 46 | 47 | 48 | 49 |
| 6 | 38 | 39 | 50 | 51 | 56 | 57 | 58 | 59 |
| v 7 | 52 | 53 | 54 | 55 | 60 | 61 | 62 | 63 |

Definition of scan [2][v][u]

Fig. 12

Row order Scan Pattern ( scan_type 4):

|   | u |   |   |   |   |   |   |   |
|---|---|---|---|---|---|---|---|---|
|   | 0 | 1 | 2 | 3 | 4 | 5 | 6 | 7 |
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | 23 |
| 3 | 24 | 25 | 26 | 27 | 28 | 29 | 30 | 31 |
| 4 | 32 | 33 | 34 | 35 | 36 | 37 | 38 | 39 |
| 5 | 40 | 41 | 42 | 43 | 44 | 45 | 46 | 47 |
| 6 | 48 | 49 | 50 | 51 | 52 | 53 | 54 | 55 |
| v 7 | 56 | 57 | 58 | 59 | 60 | 61 | 62 | 63 |

Definition of scan [4][v][u]

Fig. 13

Column order Scan Pattern ( scan_type 5):

|   | u |   |   |   |   |   |   |   |
|---|---|---|---|---|---|---|---|---|
|   | 0 | 1 | 2 | 3 | 4 | 5 | 6 | 7 |
| 0 | 0 | 8 | 26 | 24 | 32 | 40 | 48 | 56 |
| 1 | 1 | 9 | 17 | 25 | 33 | 41 | 49 | 57 |
| 2 | 2 | 10 | 18 | 26 | 34 | 42 | 50 | 58 |
| 3 | 3 | 11 | 19 | 27 | 35 | 43 | 51 | 59 |
| 4 | 4 | 12 | 20 | 28 | 36 | 44 | 52 | 60 |
| 5 | 5 | 13 | 21 | 29 | 37 | 45 | 53 | 61 |
| 6 | 6 | 14 | 22 | 30 | 38 | 46 | 54 | 62 |
| v 7 | 7 | 15 | 23 | 31 | 39 | 47 | 55 | 63 |

Definition of scan [5][v][u]

INVERSE QUANTIZER SUPPORTING MULTIPLE DECODING PROCESSES

PRIORITY CLAIM TO RELATED APPLICATION

This application makes reference to, claims priority to and claims benefit from U.S. Provisional Patent Application Ser. No. 60/369,217, entitled "Inverse Quantizer Supporting Multiple Decoding Standards" filed on Apr. 1, 2002.

INCORPORATION BY REFERENCE OF RELATED APPLICATIONS

The following U.S. Patent Applications are related to the present application and are hereby specifically incorporated by reference: patent application Ser. No. 10/114,798, entitled "VIDEO DECODING SYSTEM SUPPORTING MULTIPLE STANDARDS"; patent application Ser. No. 10/114,679, entitled "METHOD OF OPERATING A VIDEO DECODING SYSTEM"; patent application Ser. No. 10/114,797, entitled "METHOD OF COMMUNICATING BETWEEN MODULES IN A DECODING SYSTEM"; patent application Ser. No. 10/114,886, entitled "MEMORY SYSTEM FOR VIDEO DECODING SYSTEM"; patent application Ser. No. 10/114,619, entitled "INVERSE DISCRETE COSINE TRANSFORM SUPPORTING MULTIPLE DECODING PROCESSES"; and patent application Ser. No. 10/113,094, entitled "RISC PROCESSOR SUPPORTING ONE OR MORE UNINTERRUPTIBLE CO-PROCESSORS", all filed on Apr. 1, 2002; patent application Ser. No. 10/293,663, entitled "PROGRAMMABLE VARIABLE-LENGTH DECODER", filed on Nov. 12, 2002; and patent application Ser. No. 10/404,387, entitled "VIDEO DECODING SYSTEM HAVING A PROGRAMMABLE VARIABLE LENGTH DECODER"; and patent application Ser.No. 10/404,074, entitled "MEMORY ACCESS ENGINE HAVING MULTI-LEVEL COMMAND STRUCTURE"; both filed on even date herewith.

FIELD OF THE INVENTION

The present invention provides an apparatus to perform inverse quantization for multiple decoding processes. In particular, component parts of the inverser quantizer can be separately invoked via stored commands in an associated memory.

BACKGROUND OF THE INVENTION

A wide variety of multimedia devices is incorporating the ability to receive and process picture data. Multimedia devices that use picture data generally need to encode and decode the data in order to transmit and receive the encoded data across various transmission mediums. Picture data is generally displayed as a set of pixels to fill the display screen. Processing of the overall set of pixels is performed on a block-by-block basis, with each block often referred to as a MacroBlock.

For transmission purposes, the picture data is generally transformed from the spatial domain to the frequency domain, via a discrete cosine transform (DCT) device, or the like. A scan pattern is applied, and the data is quantized (or compressed). FIG. 1A shows an illustrative representation of an N×N data block 100, in this case an 8×8 block, being fed into a quantizer 102 to thereby provide compressed data 104. While any variety of color models might be used for processing the video data, FIG. 1B shows a YUV color model 110, also referred to as YCbCr. Initially configured for PAL analog video, this model is now used in CCIR-601 standard for digital video. In this standard, the color images are encoded as triplets of values, wherein the Y value represents the main image, with the U and V values representing color difference signals. The 4:1:1 representation 112 shows that 4 data blocks 114, 116, 118, and 120 (i.e., 4 8×8 blocks) are associated with the Y component, and 1 data block (8×8) each 122, 124 are associated with the respective U and V components.

One important aspect of the quantizer is to compress the incoming data. Compression schemes are generally regarded as (a) lossless, wherein no data is lost, or (b) lossy, wherein some information is lost in compression, but it does not appreciably affect the end visual result. Lossy compression is more commonplace, as any savings in the number of bits will result in a more efficient transmission. If data is considered higher in frequency, then this indicates a significant change from one pixel to the next. In contrast, lower frequency data indicates that the pixels are not varying much across the block. In certain situations, a person's eye is considered to be more sensitive to the loss of higher frequency data, as the resulting picture has lost significant information between the pixel transitions. In still other situations, a person's eye might be considered to be more sensitive to the loss of lower frequency data.

FIGS. 2A and 2B show one common approach associated with run length coders. In FIG. 2A, the 8×8 block 202 is shown arranged so that the low frequency data is in the upper left half, and the high frequency data is in the lower right half. The data is then divided by a known scaling factor 203 (shown here as integer 32) to produce integer results 204, wherein the values are rounded down to the nearest integer, including zero. Accordingly, the upper left half of the block is filled with zeros, which represents the low frequency data. The lower right half of the block contains scaled value representations of the remaining high frequency data. FIG. 2B shows a contrasting example where the data block 206 contains significant lower frequency data in the upper left half of the data block, and a reduced amount of higher frequency data in the lower half of the data block. After dividing by the scaling factor 207, the higher frequency data has been rounded-down to zeros and certain lower frequency components remain.

FIG. 3 next shows a representation of a run level code 302 that takes advantage of the rounded-down zeros that were generated in the examples above. The code is represented by a series of zeros followed by a particular data value 304. By making as many of the values as possible equal to zero, then the representation of the bits can be significantly reduced. This run level code can then be used by a transmission device 306, which might include a variable length encoder (VLC) or the like, in order to facilitate modulation and transmission across any of a variety of transmission mediums.

Upon receipt by a receiving device, the picture data must thereafter be decoded for display on a video device. The decoding will be performed by a device that performs both inverse quantization (IQ) and inverse transform (IT) operations. For instance, FIG. 4 shows a pairing of representative IQ and IT devices 400. In the IQ device 402, the coded signal is received by a run level decoder 404 to discern patterns of code in the run level signal. An inverse scan 406 is thereafter applied to re-arrange the data into a desired format. Compression techniques have earlier been applied to the data, so dequantization (or inverse quantization) 408 is performed to decompress the data.

After the IQ block, an IT block 410 is shown, wherein a two-dimensional inverse transform is performed via the use of first-dimensional inverse transform 412, a column-row RAM device 414, and a second-dimensional inverse transform 416. This IT device might be hardwired according to different coding standards being used, or programmable to accommodate different standards. An example of a programmable IT device can be found in the above referenced application entitled "Inverse Discrete Cosine Transform Supporting Multiple Decoding Processes."

Depending upon the coding standard being employed, the IQ block might need to perform additional processing upon the data after any of the various stages have been completed in the IQ process. Prior implementations have necessitated the addition of algorithmic steps—in the hardware and software—to be performed by the IQ block (or associated hardware). For instance, certain coding standards might require integer lifting or adaptive lifting to be performed on the data among any of the IQ processing steps, i.e., decoding, inverse scanning, and/or dequantization. Still other standards (i.e., MPEG4) might require inverse DC & AC prediction, or the like.

The ordering of the steps in the IQ block can also become particularized to certain coding standards. In prior implementations, each of the IQ process steps is generally performed—as a matter of implementation—regardless of whether or not each inverse process is even needed. Such additional processing tends to reduce performance of the overall system and increase power consumption. Hence, prior implementations of an IQ block are oriented around a particular coding standard and are not very versatile in handling the inverse quantization of a variety of different coding standards.

Accordingly, what is needed in the field is an inverse quantizer that is designed to be highly configurable and flexible in order to support a large number of coding algorithms. The inverse quantizer should be designed in such a way that a central processor can intervene between functions in the IQ process, in case a particular decoding algorithm requires software processing of some aspect of the algorithmic steps performed by the IQ block.

SUMMARY OF THE INVENTION

The present invention provides for an apparatus to facilitate the inverse quantization of data according to a variety of coding standards. In particular, coding applications that use an inverse quantizer (IQ) can use the present invention to selectively invoke different processes (or steps) associated with an inverse quantizer operation. For a full inverse quantizer operation, each process step can be invoked in sequence. Alternatively, individual process steps can be bypassed if they are not needed for processing a particular set of data.

Additionally, software implementations of algorithmic processes can be invoked at any point in between the set of steps comprising the inverse quantizer operation. The associated commands for any of the process steps are stored in an associated memory area. Each of the process steps and/or algorithmic processes is then invoked by referencing a certain starting address in the memory area. Different sets of commands, or algorithmic processes, can be loaded or updated by transferring new tables of information into the memory area.

The present invention also provides efficient schemes for writing the data to the memory area from the inverse quantizer block. The data can then be accessed more quickly by the inverse transformation block, which generally follows the inverse quantizer. This coordination between the inverse quantizer and inverse transform operations adds to the overall efficiency of the system.

Accordingly, one aspect of the present invention provides for an inverse quantizer apparatus for processing macroblocks of data, the apparatus having modular operation elements that can be selectably invoked to accommodate different coding standards, the apparatus comprising: a memory area having table entries corresponding to the modular operation elements; a modular operation including a decoder device, whereby the decoder device is selectably invoked via accessing the associated decoder device table entry; a modular operation including an inverse scan device, whereby the scan device is selectably invoked via accessing the associated scan device table entry; a modular operation, including a de-quantizer device, wherein the de-quantizer device is selectably invoked via accessing the associated de-quantizer device table entry; and at least one modular operation, including a processing operation that can be invoked between other modular operations, where the processing operation is selectably invoked via accessing the associated processing operation table entry.

Another aspect of the present invention provides for an inverse quantizer apparatus for processing macroblocks of data, the apparatus having modular operation elements that can be invoked via associated inverse quantizer commands in order to accommodate different coding standards, the apparatus comprising: a memory area having an input buffer interface and an output buffer interface, for storing command data, macroblock header data, and associated block coding data; a command and macroblock header decoder device; a run level decoder device; an inverse scan pattern device; and a reorder RAM device, whereby the command and macroblock header decoder device decodes commands, the macroblock headers, and associated block coding information, and the command and macroblock header decoder device passes decoded parameters and control information to the associated other devices.

Still another aspect of the present invention provides for An inverse quantizer apparatus for processing macroblocks of data, the apparatus having modular operation elements that can be selectably invoked to accommodate different coding standards, the apparatus comprising: a memory area having table entry means corresponding to the modular operation elements; a first modular operation element including a decoder device; a second modular operation element including an inverse scan device; a third modular operation element including a de-quantizer device; and at least one additional modular operation element including a processing operation that can be invoked between other modular operations, wherein the modular operations are invoked via a selectable means for accessing the table entry means.

It is understood that other embodiments of the present invention will become readily apparent to those skilled in the art from the following detailed description, wherein shown and described are only example embodiments of the invention by way of illustration. As will be realized, the invention is capable of other and different embodiments, and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Certain aspects and advantages of the present invention will be apparent upon reference to the accompanying description when taken in conjunction with the following drawings, which are exemplary, wherein:

FIG. 2A is a representative prior art diagram of a scheme to create run level data.

FIG. 2b is a representative prior art diagram of a scheme to create run level data.

FIG. 10 is a block diagram, according to one aspect of the present invention, showing a ZigZag scan pattern.

FIG. 11 is a block diagram, according to one aspect of the present invention, showing an alternate vertical scan pattern.

FIG. 12 is a block diagram, according to one aspect of the present invention, showing an alternate horizontal scan pattern.

FIG. 13 is a block diagram, according to one aspect of the present invention, showing an row order scan pattern.

FIG. 14 is a block diagram, according to one aspect of the present invention, showing a column order scan pattern.

Appendix A—representative pseudocode of run level decoding.

Appendix B—representative pseudocode of certain inverse quantization methods.

DESCRIPTION OF THE PREFERRED EMBODIMENTS

The present invention is described below in terms of certain preferred embodiments and representative applications. The example apparatus and processing methods are intended to be used with any data processing system that would benefit from having a configurable inverse quantizer. In particular, the inverse quantizer is capable of selectably processing any of the steps that is associated with the inverse quantization process. Certain algorithmic functions can be invoked between process steps. This provides the ability to process different decoding standards that might require the performance of one algorithmic function over another. Additionally, process steps can be altogether bypassed and/or implemented by software instead of hardware.

Figure 1A:
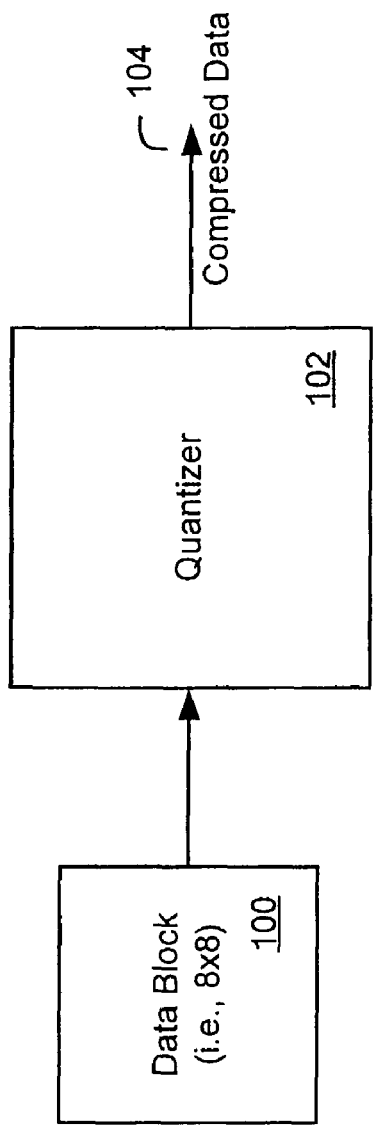
FIG. 1A is a representative prior art block diagram of a data block entering a quantizer device.
Figure 1B:
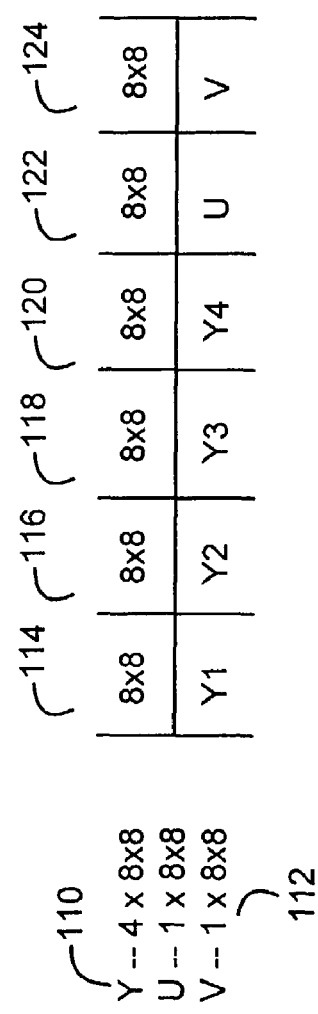
FIG. 1B is a representative prior art diagram of data blocks associated with a YUV coding scheme.
Figure 3:
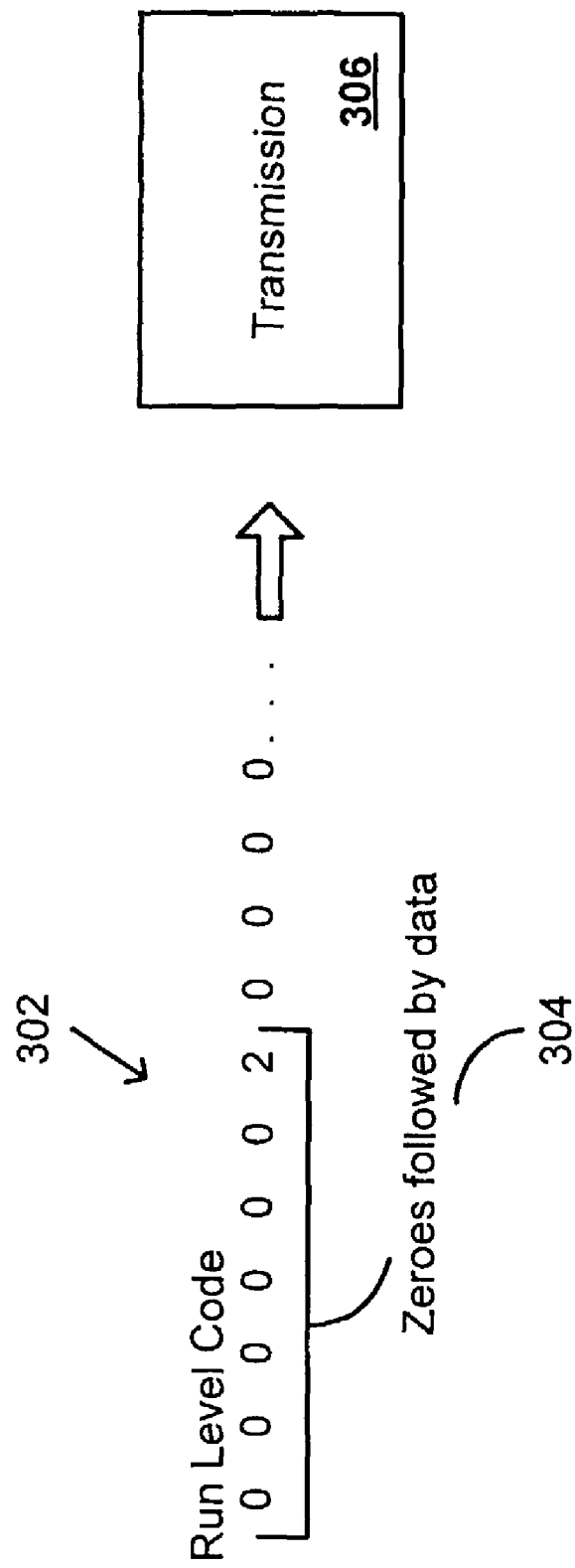
FIG. 3 is a representative prior art diagram of run level code being used for transmission.
Figure 4:
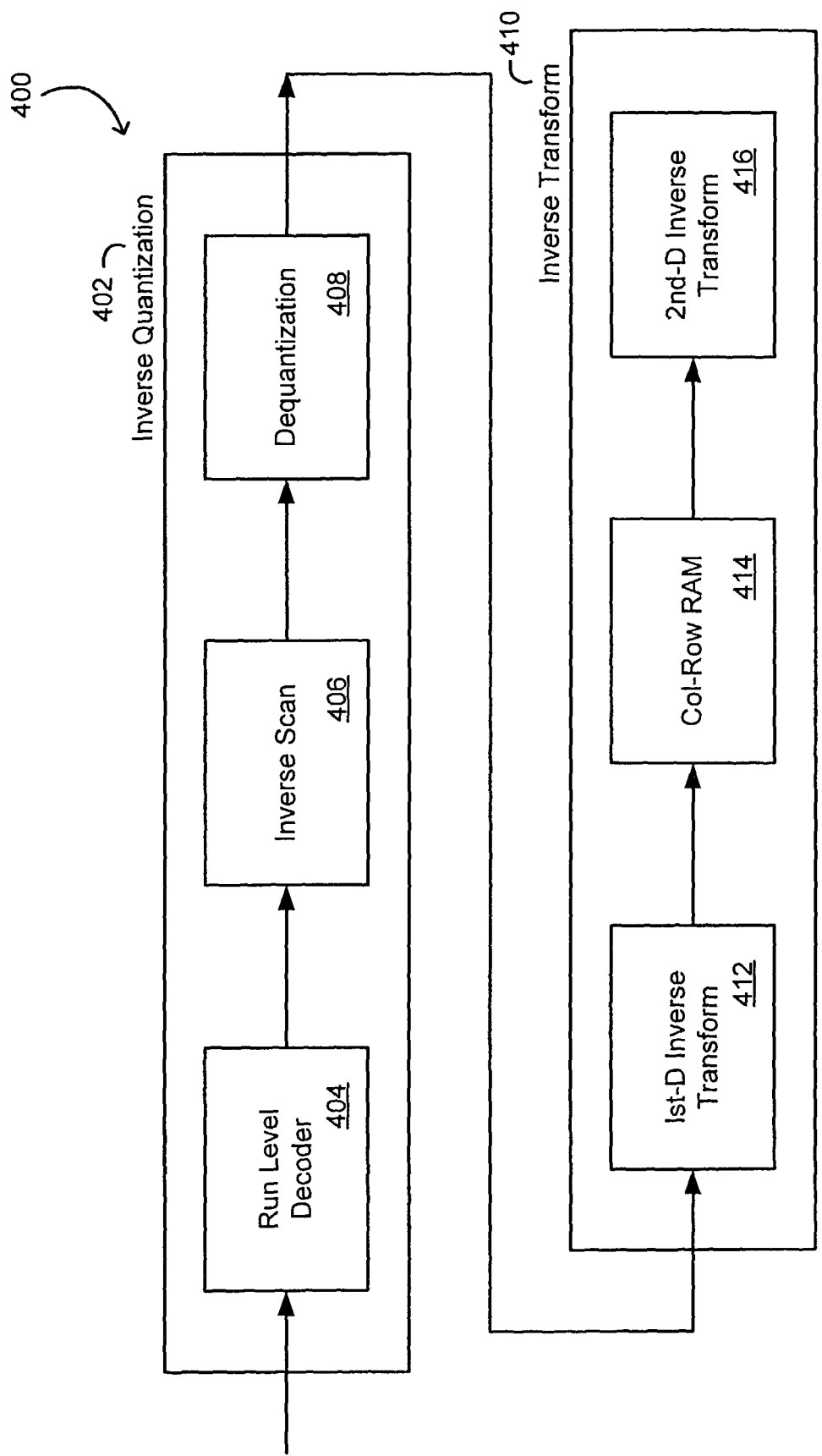
FIG. 4 is a representative prior art block diagram of elements associated with an inverse quantization block and an inverser transform block.
Figure 5:
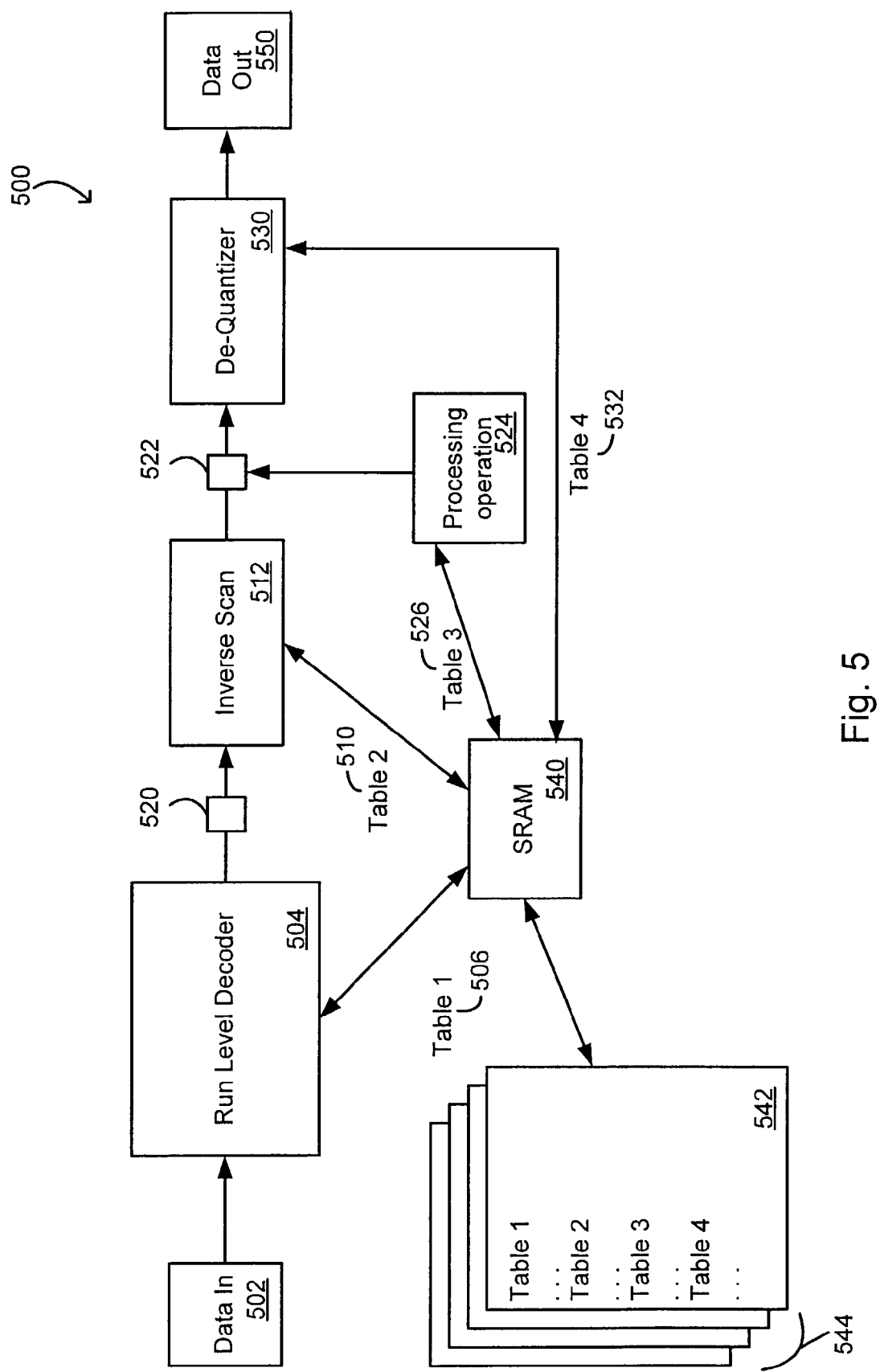
FIG. 5 is a block diagram, according to one aspect of the present invention, showing the modular operation of various elements of the inverse quantizer.

Referring now to FIG. 5, a block diagram 500 is shown of certain elements that might comprise a modular inverse quantizer device according to the present invention. Each of the components can be executed separately via reference to certain code that represents that device, which is stored generally as a table in an associated memory device. According to a command associated for a particular coding standard, the various tables are invoked in order to perform the desired inverse quantizer operation. Each of these tables can be updated at the MacroBlock (MB) level and, hence, can be changed frequently (as needed), according to different coding standards. A command can be configured that will cause downloads for these particular tables. One approach would be to preload certain commands into RAM, and then the inverse quantizer can generally be invoked. The appropriate table will then be downloaded (or referenced) at the appropriate point in completing the inverse quantizer operation.

In the present example, the incoming data is shown as 502 and enters the run-level decoder (RLD) 504. The RLD 504 is invoked via downloading Table 1 (506), which is shown stored in the SRAM 540. The tables might be stored generally as one file 542, or stored table-by-table in a set of associated files, shown generally as 544. The inverse scan operation 508 is invoked via downloading Table 2 (510). The blocks 520 and 522 are meant to represent points in the operation where intermediate software algorithms can be invoked to process the data. At point 522, a certain processing operation 524 is invoked by downloading Table 3 (526). Thereafter the de-quantizer operation 530 is invoked via downloading Table 4 (532). The resulting data 550 is output from the de-quantizer and from the IQ operation in general.

Figure 6:
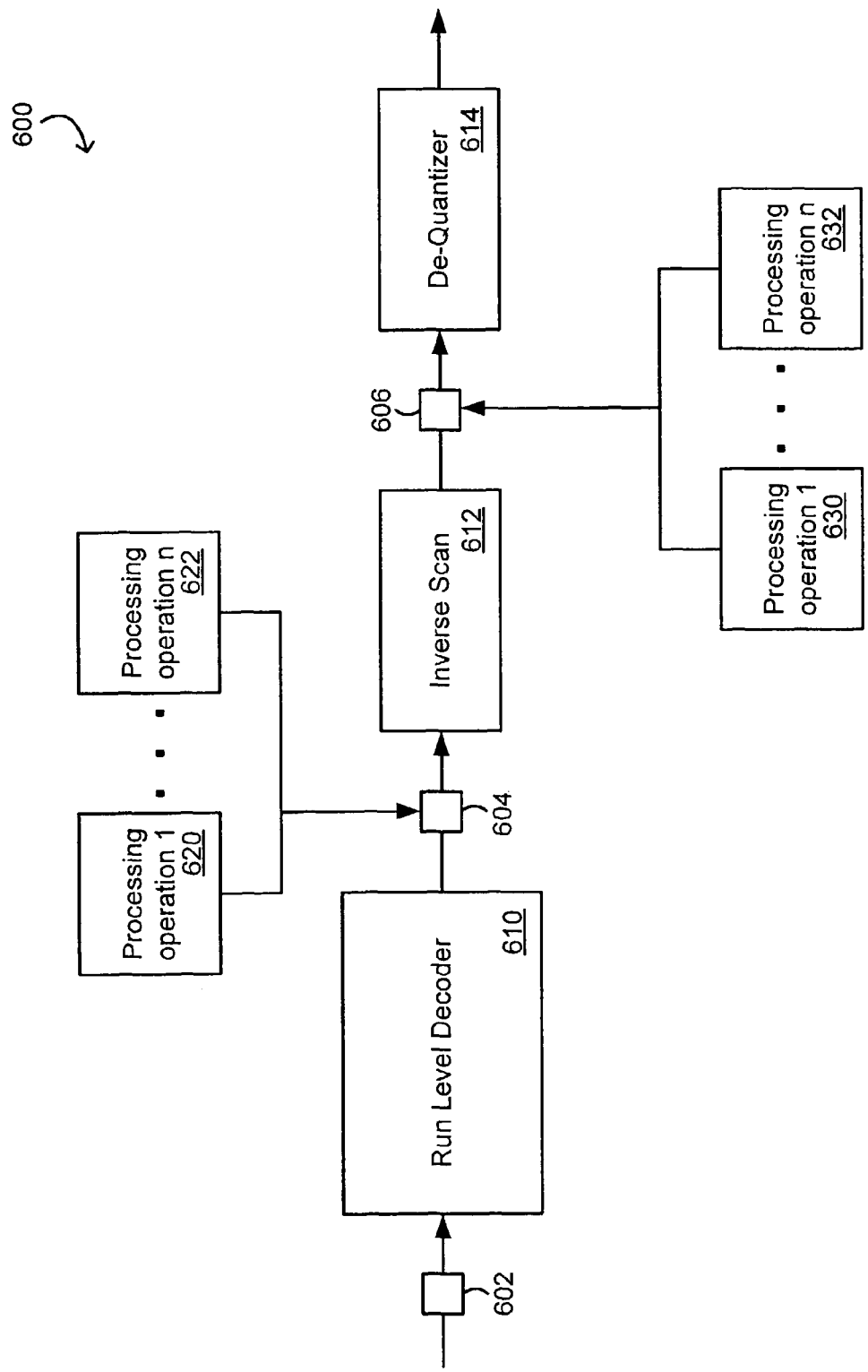
FIG. 6 is a block diagram, according to one aspect of the present invention, showing the modular operation of various elements of the inverse quantizer, and the interjection of certain processing operations between the element blocks.

FIG. 6 next shows a similar block diagram 600 of certain representative process steps comprising the modular inverse quantizer of the present invention. This block diagram is meant to further demonstrate the ability to interject any number of processing operations into the inverse quantizer flow of operation. Blocks 602, 604, and 606 show representative points between the inverse quantizer operation steps where such processing operations might be interjected. Block 602 is shown before the run level decoder 610 is even encountered. Block 604 is shown between the run level decoder 610 and the inverse scan 612. Block 606 is shown between the inverse scan 612 and the de-quantizer 614. For block 604, a plurality of processing operations is shown ranging from operation 1 (620) through operation n (622). For block 606, a plurality of processing operations is similarly shown ranging from operation 1 (630) through operation n (632). As mentioned above, such processing operations might include, for instance, inverse DC and AC prediction for MPEG4 standard coding, or advanced "Intra" code mode for H263+, lifting functions for Microsoft's WMV standard.

Figure 7:
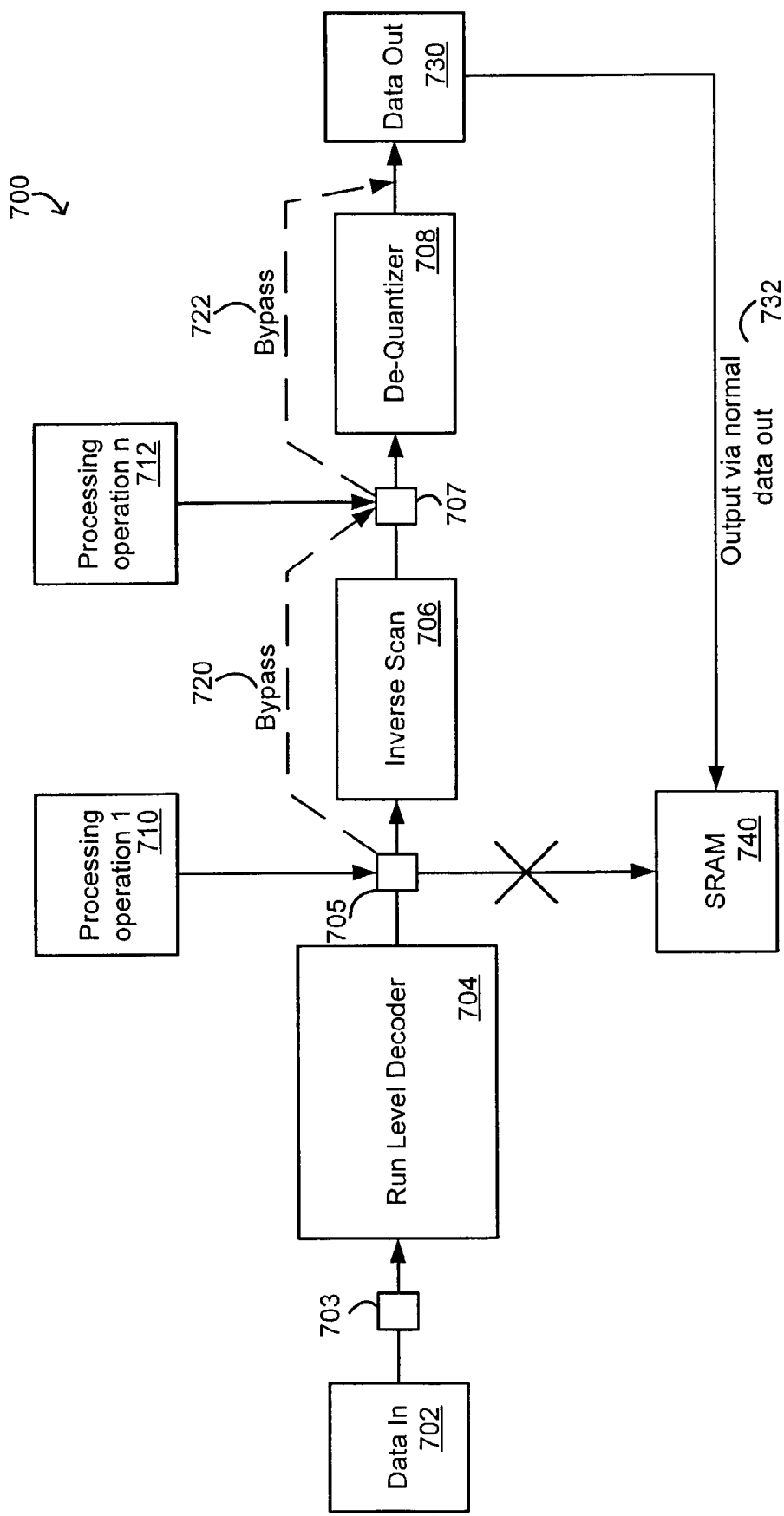
FIG. 7 is a block diagram, according to one aspect of the present invention, showing the modular operation of various elements of the inverse quantizer, and the ability to bypass certain operations, as needed.

FIG. 7 shows another similar block diagram 700 of certain representative elements that might comprise the modular inverse quantizer of the present invention. In this example, the incoming data 702 is shown entering the run level decoder 704. Certain blocks 703, 705, and 707 are shown as representative points for interjecting processing operations, as needed. A processing operation 1 (710) is shown being interjected between the run level decoder 704 and the next step, which would be the inverse scan 706. A processing operation n (712) is also shown being interjected between the inverse scan 706 and the de-quantizer 708. In this example, however, the inverse scan 706 and the de-quantizer 708 processing steps are bypassed, as shown respectively by 720 and 722. One aspect that this figure demonstrates is that the outgoing data 730 will be output to the associated memory device (i.e., SRAM) 740 via a normal link 732 configured after the bypassed inverse scan 706 and de-quantizer 708 steps. With the indicated bypass operations, the data might be stored from block 705 directly to SRAM 740. However, the present invention provides for output of the data 730 via link 732, despite the bypass of certain steps within the inverse quantizer operation.

Figure 8:
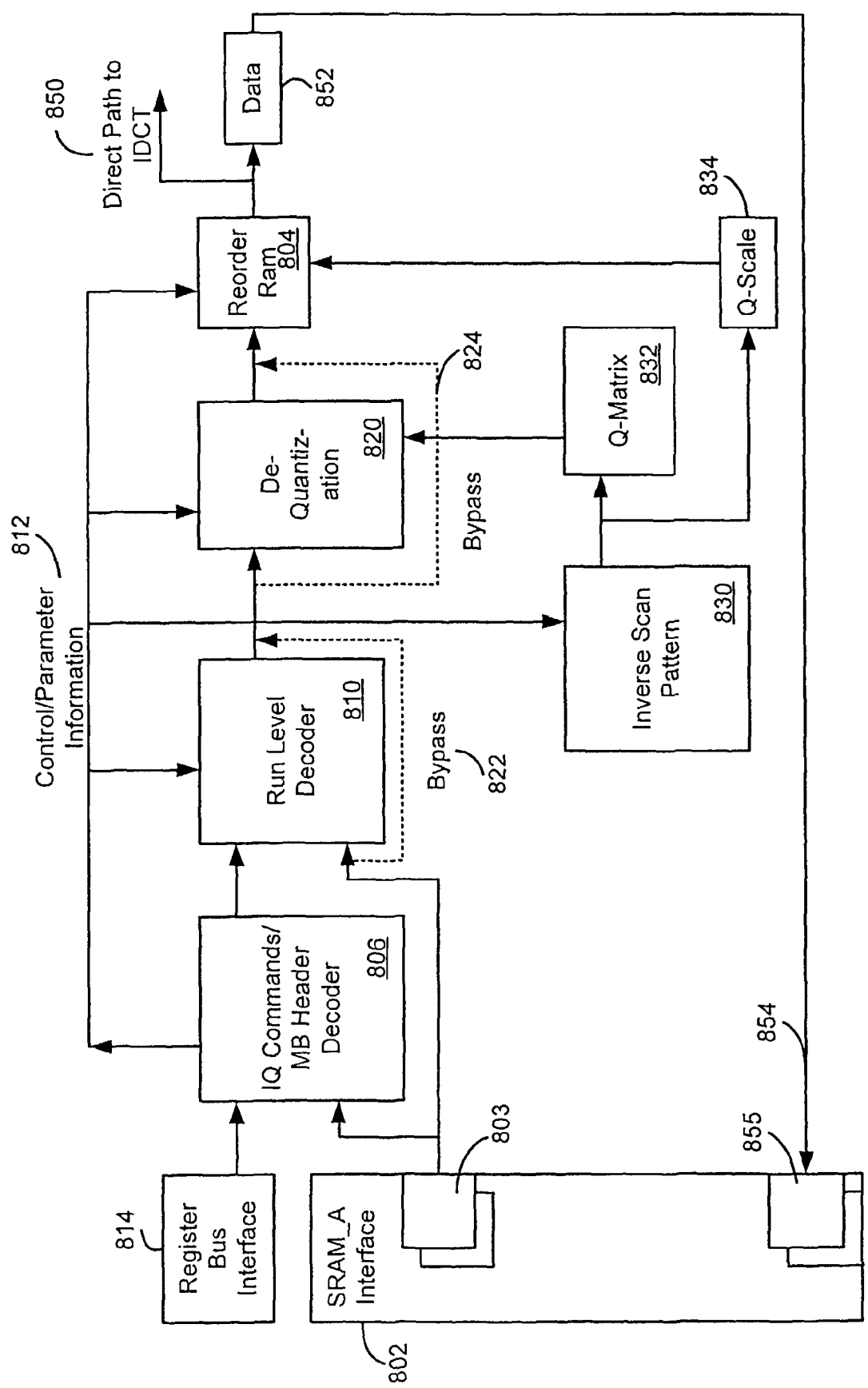
FIG. 8 is a block diagram, according to one aspect of the present invention, showing a more particularized implementation of the modular operation of various elements of the inverse quantizer.

A more particularized example of the present invention is demonstrated via the functional blocks 800 comprising FIG. 8. Elements from FIG. 8 (in the 800+ numbering range) will be referred to through the remainder of this description. This inverse quantizer implementation is intended to support 8×8, 8×4, 4×8, and 4×4 block coding. The IQ will stay in the "ready" state in order to wait for an "iq_bgn" (or IQ begins) signal to be issued. The iq_bgn signal is issued by the overlying processor associated with the IQ device. This processor might include a MIPS, or other such processor, for doing a wide variety of video processing (or other such) functions. The iq_bgn will generally not be issued until the MB header, the data (as output from a programmable variable length decoder PVLD, or the like), and the commands as shown SRAM_A (802) are ready for IQ processing, and the register of the "IQ commands Start Address" (i.e., reg x00) is programmed. A register bus interface is shown as 814.

Figure 9:
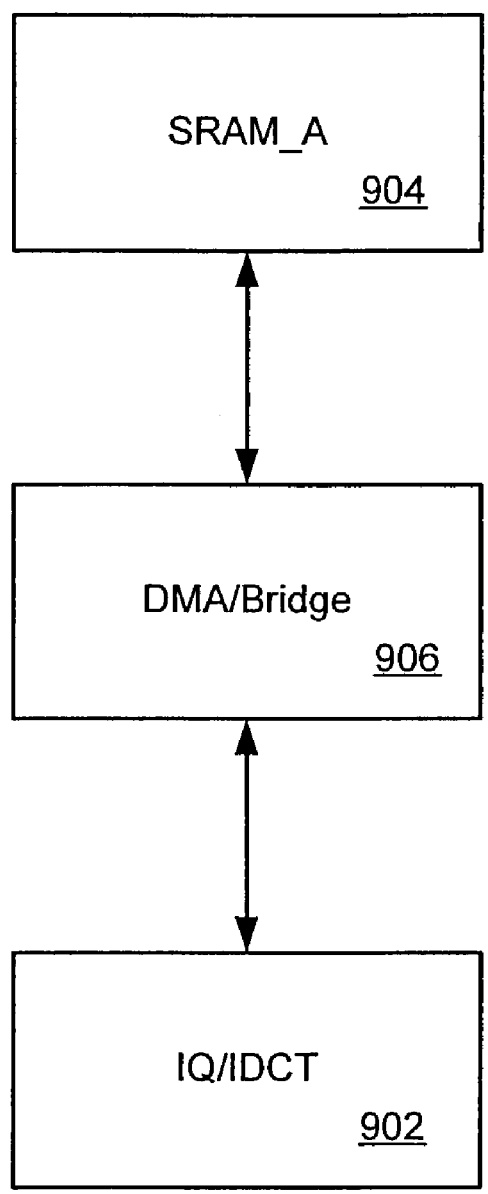
FIG. 9 is a block diagram, according to one aspect of the present invention, showing the IQ/IDCT interfacing with a RAM device via a DMA/Bridge.

After the IQ block detects that iq_bgn is set, then it generates SRAM_A memory requests based on the value of the "IQ command Start Address register" to a DMA/Bridge interface block. FIG. 9 shows this general arrangement, wherein the IQ and/or IDCT blocks 902 interact with the SRAM_A 904 through the DMA/Bridge 906. All of the incoming and outgoing data associated with the MacroBlocks generally goes into the DMA/Bridge 906, which in turn discerns and grants the various commands/requests.

According to one aspect, the IQ block can read commands from the SRAM_A 802 and then decode the commands. The IQ block can then depend upon the decoded command in order to perform the appreciated function(s). The functions are controlled via control/parameter information 812 sent from block 806 to the various other functional blocks. For instance, the command EXE_CMD lists the particular functions (i.e., RLD, IS, and/or De-quantization (DQ)) that need to be executed with a particular MacroBlock Buffer ID. The IQ block generates SRAM_A memory requests, based upon the MacroBlock Buffer ID [2:0], in order to read MB header and data from one of the MB buffers in the SRAM_A.

In general, this IQ is meant to support a variety of coding standards, including, for instance, MPEG2, MPEG4, H263+, and WMV standards. As indicated above, the IQ is designed and configured such that the MIPS can intervene between functions in the process, in case a particular decoding algorithm (e.g., DC/AC prediction, lifting, and so forth) requires software processing of some aspect of the algorithmic steps performed by the IQ block. Accordingly, the IQ block is designed to be highly configurable and flexible to support other coding algorithms. Moreover, in order to further achieve higher performance, and to reduce power consumption, the IQ performs RLD, IS, and DQ process steps only when the data block is coded and might require such steps.

Referring again to FIG. 8, block 806 shows a device for handling IQ commands and/or performing MB header decoding. This device, herein referred to as Command/Header Decoder (CHD) 806, carries a main function of decoding commands, the MB header, and the block coding information. Thereafter, the CHD passes decoded parameters and control information 812 to the associated sub-blocks. The CHD 806 stays in the ready state to wait for iq_bgn to be issued. The iq_bgn flag will not be issued by the MIPS until the MB header, the data (i.e., output from the PVLD), and the commands in the SRAM_A 802 are ready for IQ processing. The register of the IQ Commands Start Address (reg x00) is programmed, or IQ EXE Command (reg x08) is written.

After the IQ block detects that iq_bgn is set, the IQ block generates SRAM_A memory requests based on the value of IQ Command Start Address register to the DMA/Bridge interface block, if a flag "iqcmd_direct" is set to zero. The CHD then reads commands from the SRAM_A, and decodes these commands. If iqcmd_direct is set to one, then the IQ block directly decodes the command from the IQ EXE_CMD register.

The IQ block therefore decodes the command(s) and performs the associated function(s) based upon the command(s). Such commands might include, for example, run level decoding, inverse scan, or de-quantization. According to the appreciated functions, the IQ generates requests to the DMA/Bridge interface block to read/write data from the SRAM-A through an associated SRAM_A bus. The result of the IQ block is stored back to the same MacroBlock buffer. When the IQ block completes the Exe Function command with a "cmd_done" enable, the IQ block will set the flag iq_done.

The IQ block sets iq_done upon completion of the "Exe function" command whose "cmd_done" mark is set. For example, an EXE_CMD=1111_10_10_11_1_000 means that the IQ block will not set iq_done to high until it completes execution of RLD, IS, and DQ functions and writes the result of the IQ back to the MacroBlock buffer with an ID number equal to "2." Note that in the MPEG2 case, there is no need to wait for data write back to the MacroBlock buffer to set the iq_done since there is a direct path 850 provided from the IQ to the IDCT. The IQ block sets iq_done as soon as it completes the write of the last pel (pixel element) of a MacroBlock into the Reorder RAM 804.

As another example, if EXE_CMD=1111_00_00_00_1_xxx, then the IQ block will set iq_done as soon as the previous command has been completed. After IQ sets iq_done, it will then stay in a "ready state" waiting for the next iq_bgn to be issued.

In order to enhance the MIPS performance and reduce the overall hardware cost, associated Command Ques are designed to be embedded in the SRAM_A. Accordingly, the MIPS only needs to update the IQ Command Start Address register before it issues an iq_bgn. There is another option to read the command directly from the IQ EXE_CMD register instead of reading it from SRAM_A. This option can serve to reduce the memory traffic and associated latency, which also further enhances MIPS and IQ performance. In general, the MIPS processor might issue other sets of commands after the iq_done flag is set, but will not generally issue new sets of commands before iq_done is set.

As a representative example, Table 1 lists a set of IQ commands and its respective command format. The format stored in the SRAM_A is based on a 128-bit aligned configuration. The first command is located in the first 8 most-significant-bits (MSB), i.e., SRAM_A [IQ_CMD_Start_address][127:120]. The second command is stored in the next set of bits, i.e., SRAM_A [IQCMD_Start_address][119:112], and so forth.

In order to future expand this configuration, and to provide more flexibility to support different standards and requirements, the present configuration is shown to include 4 different types of the Q-Matrix, shown as block 832. These four types include: Intra Luma, non-intra Luma, Intra Chroma, and non-intra Chroma. Even if just MPEG2 and MPEG4 standards are accommodated (for example), these four Q-Matrix areas will be loaded with appropriate values. These include: (a) Intra Luma Matrix=Intra Chroma Matrix=default "Intra Matrix," which is defined in the MPEG 2/4 standard or carried in the bit streams. (b) Non-Intra Luma Matrix=Non-Intra Chroma Matrix=default "non-Intra Matrix" as defined in the MPEG 2/4 standard, or carried in the bit streams. In other words, the MIPS will issue 4 "Load xxx Qmatrix" (or the like) commands, even in MPEG 2/4 cases.

TABLE 1

Representative IQ commands and command formats:

| Command | Binary Pattern X_bin.code_value (16 bits) | Bit Field Descriptions |
|---|---|---|
| Load Intra Luma Q-Matrix (picture level) | 0000_AAAA | Load Intra Luma Q matrix from SRAM_A[AAAA] to QRAM. The transfer size is 64 bytes. This is a list of 64 8-bit unsigned integers.<br>AAAA[9:0]: represents the start address of Intra Q matrix stored in the SRAM_A. It is based on 128-bit.<br>In MPEG2, MPEG4, these 64 8-bits values are encoded in the default zigzag scanning order as described in FIG. 10.<br>In other words,<br>Intra Y_QMatrix_RAM[0]=SRAM A[AAAA][127:120];<br>IntraY_QMatrix_RAM[1]=SRAM_A[AAAA][119:112];<br>Intra Y_QMatrix_RAM[8]=SRAM_A[AAAA][111:104];<br>Intra Y_QMatrix_RAM[16]=SRAM_A[AAAA][103:96];<br>......<br>Intra Y_QMatrix_RAM[63]=SRAM_A[AAAA+3][7:0]; |
| Load non-Intra Luma QMatrix (picture level) | 0001_AAAA | Load non-Intra Luma Q matrix from SRAM_A[AAAA] to QRAM. The transfer size is 64 bytes. This is a list of 64 8-bit unsigned integers.<br>AAAA[9:0]: represents the start address of non-Intra Q matrix stored in the SRAM_A. It is based on 128-bit.<br>In MPEG2, MPEG4, these 64 8-bits values are encoded in the default zigzag scanning order as described in FIG. 10. |
| Load Intra Qmatrix | 0010_AAAA | Load IntraQ Chroma matrix from SRAM_A[AAAA] to QRam. The transfer size is 64 bytes. It is based on 128-bit.<br>AAAA[9:0]: represents the start address of Intra Chroma-Q matrix stored in the SRAM_A. |
| Load non-intra Chroma Qmatrix | 0011_AAAA | Load non-intra Chroma Q matrix from SRAM_A[AAAA] to QRAM. The transfer size is 64 bytes. It is based on 128-bit.<br>AAAA[9:0]: represents the start address of non-intra Chroma Q matrix stored in the SRAM_A. It is based on 128-bit. |
| Load linear Qscale (standard level) | 0100_AAAA | Load Linear Qscale from SRAM_A[AAAA] to Qscale memory. The transfer size is 32 bytes.<br>AAAA[9:0]: represents the start address of Linear Qscale stored in the SRAM_A. It is based on 128-bit. |
| Load linear Qscale (standard level) | 0101_AAAA | Load Nonlinear Qscale from SRAM_A[AAAA] to Qscale memory. The transfer is 32 bytes.<br>AAAA[9:0]: represents the start address of Nonlinear Qscale stored in the SRAM_A. It is based on 128-bit. |
| Load Qmatrix scan pattern (used for unknown standard) | | It is done by firmware. From hardware point of view: it generally assumes the zigzag write order is used. |
| Load 8×8 scan pattern (MB level) | 1001_AAAA | Load 8×8 scan pattern from SRAM_A[AAAA] to the 8×8 block area of Scan pattern memory. The transfer size is 64 bytes. The data is in raster scan order.<br>AAAA[9:0]: represents the start address of scan pattern stored in the SRAM_A. It is based on 128-bit. |
| Load 8×4 scan pattern (MB level) | 1010_AAAA | Load 8×4 scan pattern from SRAM_A[AAAA] to the 8×4 block area of Scan pattern memory. The transfer size is 32 bytes. The data is in raster scan order.<br>AAAA[9:0]: represents the start address of scan pattern stored in the SRAM_A. It is based on 128-bit. |
| Load 4×8 scan pattern (MB level) | 1011_AAAA | Load 8×8 scan pattern from SRAM_A [AAAA] to the 4×8 block area of Scan pattern memory. The transfer size is 32 bytes. The data is in raster scan order.<br>AAAA[9:0]: represents the start address of scan pattern stored in the SRAM_A. It is based on 128-bit. |
| Load 4×4 scan pattern (MB level) | 1100_AAAA | Load 4×4 scan pattern from SRAM_A [AAAA] to the 4×4 block area of Scan pattern memory. The transfer size is 16 bytes. The data is in raster scan order.<br>AAAA[9:0]: represents the start address of scan pattern stored in the SRAM_A. It is based on 128-bit. |
| Exe Function (MB level) | 1111_RW_ZW_QW_X_MBID | R: Run/Level Decoder Enable. When high indicated, enable the Run Level Decoder block. When low indicated, by-pass the Run level Decoder block.<br>Z: Inverse Scan Enable.<br>Q: De-Quantization Enable<br>X: command done. When high indicated IQ will set the "iq_done" to high after completing this command.<br>W: when high indicated in the result, after executing the appreciated function, will write back to SRAM_A.<br>MBID[2:0]: MacroBlock Buffer ID. IQ read the MB header and data, from the one of the MacroBlock buffers, |

TABLE 1-continued

Representative IQ commands and command formats:

| Command | Binary Pattern X_bin.code_value (16 bits) | Bit Field Descriptions |
|---|---|---|
| | | according to the MBID[2:0].<br>General Notes:<br>1. This "Exe Function" command with X set to high means this command is the last command of the command Que.<br>2. Only one of the W's will be set to high (Ex1, Ex2); or none of W's will be set to high and associated with X with value of 1 (See Ex 3 below).<br>3. Examples for using "Exe function" command:<br>Ex 1: if cmd="1111_10_10_11_1_001" means IQ block will not set "iq_done" to high until it completed executed RLD, IS, DeQ functions and write the result of DeQ back to MacroBlock Buffer with ID number is equal to 1.<br>Ex2: if cmd ="1111_00_11_00_1_003" means IQ block will not set "iq_done" to high until it completes execution of IS function, and write the result of IS back to MacroBlock Buffer with ID number is equal to 3.<br>Ex3: if cmd="1111_00_00_00_1_001" IQ block will set "iq_done" as soon as the previous command has been completed. This is used when MIPS decode SEQ/PIC layer info which contains Qmatrix, or scan pattern..., after MIPS stores new info to SRAM_A, MIPS might issue IQ commands to let IQ block start loading Qmatrix or scan pattern form SRAM_A to IQ block. In this case, the set of commands only contains "Load" commands plus exe_cmd="1111_00_00_00_1_xxx" which is the last command of the command que. |

In general, each MacroBlock buffer 803 consists of two regions: (1) MacroBlock Buffer Header Zone, wherein the first two locations of a MacroBlock Buffer are reserved for storing MB header and block coding information; (2) MacroBlock Coefficient zone, wherein the remaining locations are reserved for storing MB run/level tokens or coefficients.

The token format of MB headers and Block coding stored in the MacroBlock Buffer Header Zone are defined in the following manner:

TABLE 2

MB headers and block coding.

| Command | Received Module | Binary Pattern X_bin.code_value (21 bits) | Bit Field Descriptions |
|---|---|---|---|
| Y0Y1BLK Coding | IQ/IDCT | 1_000_Y0[5:0]_Y1[5:0]_xxxxx | Yn[5:4]:<br>00 represents 8×8 coding;<br>01 represents 8×4 coding;<br>10 represents 4×8 coding;<br>11 represents 4×4 coding;<br>if Yn[5:4]=01 or 10,<br>then Yn[3:2] is used for:<br>01 represents Bottom (or Right) only;<br>00 represents N/A<br>11 represents TOP and BOTTOM both appear;<br>10 represents Top (or Left) only;<br>if Yn[5:4] = 11,<br>then Un[3:0] is used for indicating which 4×4 bocks are coded. When high, it indicates the 4×4 block is coded. When low, it indicates the 4×4 block is not coded.<br>Yn[3]: represents top-left 4×4 block.<br>Yn[2]: represents top-right 4×4 block.<br>Yn[1]: represents bottom-left 4×4 block.<br>Yn[0]: represents bottom-right 4×4 block.<br>This command will be generally used only if the 8×8 block coding type is zero, |

TABLE 2-continued

MB headers and block coding.

| Command | Received Module | Binary Pattern X_bin.code_value (21 bits) | Bit Field Descriptions |
|---|---|---|---|
| Y2Y3BLK Coding | IQ/IDCT | 1_001_Y2[5:0]_Y3[5:0]_xxxxx | and is defined in the MB header with TTT=3'b001 Data [13].<br>Yn[5:4]:<br>00 represents 8×8 coding;<br>01 represents 8×4 coding;<br>10 represents 4×8 coding;<br>11 represents 4×4 coding;<br>if Yn[5:4]=01 or 10,<br>then Yn[3:2][ is used for:<br>01 represents Bottom (or Right) only;<br>00 represents N/A;<br>11 represents TOP and BOTTOM both appear;<br>10 represents Top (or Left) only;<br>if Yn[5:4] = 11,<br>then Yn[3:0] is used for indicated which 4×4 blocks are coded. When high indicated the 4×4 block is coded, when low indicated the 4×4 block is not coded.<br>Yn[3]: represents top-left 4×4 block.<br>Yn[2]: represents top-right 4×4 block.<br>Yn[1]. represents bottom-left 4×4 block.<br>Yn[0]: represents bottom-right 4×4 block.<br>This command will be used only and only if 8×8 block coding type is zero, is defined in the MB header with TTT=3'b001 Data [13]. |
| UV BLK Coding | IQ/IDCT | 1_010_U[5:0]_V[5:0]_xxxxx | Yn[5:4]:<br>00 represents 8×8 coding;<br>01 represents 8×4 coding;<br>10 represents 4×8 coding;<br>11 represents 4×4 coding;<br>if Yn[5:4]=01 or 10,<br>then Yn[3:2] is used for:<br>01 represents Bottom (or Right) only;<br>00 represents N/A<br>11 represents TOP and BOTTOM both appear;<br>10 represents Top (or Left) only;<br>if Yn[5:4] = 11,<br>then Yn[3:0] is used for indicating which 4×4 blocks are coded. When high, it indicates the 4×4 block is coded. When low, it indicates the 4×4 block is not coded.<br>Yn[3]: represents top-left 4×4 block.<br>Yn[2]: represents top-right 4×4 block.<br>Yn[1]: represents bottom-left 4×4 block.<br>Yn[0]: represents bottom-right 4×4 block.<br>This command will be generally used only if the 8×8 block coding type is zero, and is defined in the MB header with TTT=3'b001 Data [13]. |
| MB_header | IQ/IDCT | 0_01_TTT_DDD[14:0] (TBD) | 17:15 (TTT): represents the Data Type<br>000: Macro Block Address; Data [14:2] represents MBA<br>001: Contains MB layer info. (used by IQ/IDCT)<br>Data [14] Intra;<br>Data [13]: 8×8 block coding.<br>1=every block within a MB is 8×8 block coding.<br>Data[12:7]: coded block pattern: Y0Y1Y2Y3U0V0<br>Data[4:3]: quantization method<br>00: n/a; |

TABLE 2-continued

MB headers and block coding.

| Command | Received Module | Binary Pattern X_bin.code_value (21 bits) | Bit Field Descriptions |
|---|---|---|---|
| | | | 01: method 1 (MPEG2; MPEG4);
10: method 2 (H263; MPEG4);
11: method 3 (MPEG1);
010: Contains Picture layer info. (used by IQ)
Data[14]: Qscale-type; 0: linear scale; 1: non-linear scale.
011: QScale factor
Data[14:10]: Quantizer scale factor (used by IQ's AC coeffs). In the 2-rows decoding scheme, this parameter has to update every MB. In a single row scheme, this parameter will be updated only if its value is changed. IQ block has a local register to store Q scale for AC coeff. This scale factor is effectively an index, and to get the final quantizer_value a lookup to either linear/non-linear Q-scale tables has to be performed.
100: DC_Scale info.
Data[14:9]: DC_scaler_Luma. It is used for DC Luminance coeff. Example: reconstructed DC value of Luminance component, F"[0]=dc_scaler * QF[0][0]; where QF[0][0]is the quantized value from PVLD or MIPS.
Data[8:3]: DC_scaler_Chroma. It is used for DC Chrominance coeff. Example: reconstructed DC value of Chrominance component, F"[0] = dc_scaler * QF[0][0]; where * QF[0][0] is the quantized value from PVLD or MIPS. |
| End of info | IQ/IDCT | 1_111_xxxx_xxxx xxxx | End of header info |

In the table below, the first two locations (N, N+1) of a MacroBlock buffer are reserved for storing the MB header and block coding information. The remaining locations, from N+2 to N+73, are reserved for storing MB data or Run/level tokens. The first location of each of the Y0/Y1/Y2/Y3/U/V blocks is in the fixed locations specified as: N+2, N+14, N+26, N+38, N+50, and N+62, respectively, regardless of whether other blocks are coded. The RLD only decodes the block if it is coded. If the block is not coded, the RLD will skip the block and jump to the next encoded block. The coefficients are continuously within a sub-block (wherein the sub-block unit is either 8×8, 8×4, 4×8, or 4×4 sub-block). Accordingly, the following table shows an example of the data format stored in the MacroBlock buffers for the case of the RLD's input. If Y0, Y2 and V are coded 8×8 blocks, then Y1, Y3, and U are not coded. In other words, in this example, only the Y0, Y2, and V data are valid and need to be further decoded, and the Y1, Y3, and U data are not valid and need not be decoded.

TABLE 3

First representative example of data format for RLD input.

| SA[127:0] Addr N | [127:107] MB | [106:86] Header | [85:65] /Block | [64:44] Coding | [43:23] info | [22:2] | [1:0] |
|---|---|---|---|---|---|---|---|
| N + 1 | | | | | | | xx |
| N + 2 | Y0 BLK | (Valid | RUN | LEVEL | TOKENs) | | xx |
| ... | | | | | | | xx |
| ... | | | | | | | xx |
| N + 14 | Y1 BLK | (No valid | Tokens) | | | | xx |
| ... | | | | | | | xx |
| ... | | | | | | | xx |
| N + 26 | Y2 BLK | (Valid | RUN/ | LEVEL | TOKENs) | | xx |
| ... | | | | | | | xx |
| ... | | | | | | | xx |
| N + 38 | Y3 BLK | (No valid | Tokens) | | | | xx |
| ... | | | | | | | xx |
| ... | | | | | | | xx |

TABLE 3-continued

First representative example of data format for RLD input.

| SA[127:0] Addr N | [127:107] MB | [106:86] Header | [85:65] /Block | [64:44] Coding | [43:23] info | [22:2] | [1:0] |
|---|---|---|---|---|---|---|---|
| N + 50 | U0 BLK | (No valid | Tokens) | | | | xx |
| ... | | | | | | | xx |
| ... | | | | | | | xx |
| N + 62 | V0 BLK | (Valid | RUN / | LEVEL | TOKENs) | | xx |
| | | | | | | | xx |
| N + 73 | | | | | | | xx |

As a second example, the table below shows the data format of the MacroBlock buffers, wherein the input of the RLD at Y0=8×8 block coding; Y1=2 of 8×4 block coding; Y2=2 of 4×4 block coding (i.e., the 1$^{st}$ and the 3$^{rd}$ blocks are coded, and the 2$^{nd}$ and 4$^{th}$ are not coded); V=8×8 block coding; and Y3 and U are not coded blocks.

TABLE 4

Second representative example of data format for RLD input.

| SA[127:0] Addr N | [127:107] MB | [106:86] Header | [85:65] /Block | [64:44] Coding | [43:23] info | [22:2] | [1:0] |
|---|---|---|---|---|---|---|---|
| N + 1 | | | | | | | xx |
| N + 2 | Y0 BLK (1$^{st}$ Token) | (RUN / | LEVEL | TOKENs) | | | xx |
| ... | | | | | | | xx |
| ... | | | | | | | xx |
| N + 14 | Y1 BLK TOP's 1$^{st}$ Token | (RUN / | LEVEL | TOKENs) | | | xx |
| | | | | | | | xx |
| N + 19 | | | | | | | xx |
| N + 20 | Y1 BLK Bottom's 1$^{st}$ Token | (RUN / | LEVEL | TOKENs) | | | xx |
| ... | | | | | | | xx |
| N + 25 | | | | | | | xx |
| N + 26 | Y2 BLK (1$^{st}$ block is coded) | (RUN / | LEVEL | TOKENs) | | | xx |
| | | | | | | | xx |
| | | | | | | | xx |
| N + 29 | Y2 BLK (2$^{nd}$ block is not coded) | (No | Valid | Token) | | | xx |
| | | | | | | | xx |
| | | | | | | | xx |
| N + 32 | Y2 BLK (3$^{rd}$ block is coded) | (RUN / | LEVEL | TOKENs) | | | |
| N + 35 | Y2 BLK (4$^{th}$ block is not coded) | (No | Valid | Token) | | | |
| N + 38 | Y3 BLK | (No | Valid | Token) | | | xx |
| ... | | | | | | | xx |
| ... | | | | | | | xx |
| N + 50 | U0 BLK's | (No | Valid | Token) | | | xx |
| ... | | | | | | | xx |
| ... | | | | | | | xx |
| N + 62 | V0 BLK's 1$^{st}$ Token | (RUN / | LEVEL | TOKENs) | | | xx |
| ... | | | | | | | xx |
| N + 73 | | | | | | | xx |

The first locations (N, N+1) of the MacroBlock Buffer are reserved for storing MB header and IQ/IDCT block coding information. The IQ block does not modify these two locations. The locations from N+2 to N+73 are reserved for storing MB data or dequantized coefficients. The first coefficient of every Y0/Y1/Y2/Y3/U/V block is generally in the fixed location which is N+2, N+14, N+26, N+38, N+50, and N+62 respectively, regardless of whether other blocks are coded. The coefficients are continuously within a block (i.e., the block unit is either 8×8, 8×4, 4×8, or 4×4 blocks). The data format is a 16-bit 2's compliment number and stored in column order. The output of the de-quantization is stored in column order so as work in association with the logic of the inverse transform and to improve the performance thereof. Accordingly, the output of the 2-D IDCT will not need to convert the result to "row" order. Such storage configurations are discussed further below.

The table below show an example of the data format of the MacroBlock buffers, wherein the output of the de-quantization at Y0=8×8 block coding; Y1=2 of 8×4 block coding; Y2=2 of 4×4 block coding (i.e., the 1$^{st}$ and 3$^{rd}$ blocks are coded, and the 2$^{nd}$ and 4th are not coded); V0=8×8 block coding; Y3 and U are not coded.

TABLE 5

Representative example of data format for de-quantization output.

| SA[127:0]<br>[ ]Addr<br>N | [127:112]<br>MB<br>Header | [111:96]<br>/ Block | ...<br>Coding | ...<br>info | ...<br>[15:0] |
|---|---|---|---|---|---|
| N + 1 | | | | | |
| N + 2 | Y0 BLK<br>(1$^{st}$<br>Coeff) | (Valid | Coeffs) | | |
| ... | | | | | |
| N + 14 | Y1 BLK<br>Top's 1$^{st}$<br>Coeff | (Valid | Coeffs) | | |
| N + 19 | | | | | |
| N + 20 | Y1 BLK<br>Bottom's<br>1$^{st}$ Coeff | (Valid | Coeffs) | | |
| ... | | | | | |
| N + 25 | | | | | |
| N + 26 | Y2 BLK<br>(1$^{st}$ block<br>coded) | (Valid | Coeffs) | | |
| N + 29 | Y2 BLK<br>(2$^{nd}$<br>block) | (No | Valid | Coeffs) | |
| N + 32 | Y2 BLK<br>(3$^{rd}$<br>block) | (Valid | Coeffs) | | |
| N + 35 | Y2 BLK<br>(4$^{th}$<br>block) | (No | Valid | Coeffs) | |
| N + 38 | Y3 BLK's | (No | Valid | Coeffs) | |
| ... | | | | | |
| N + 50 | U0 BLK's | (No | Valid | Coeffs) | |
| ... | | | | | |
| N + 62 | V0 BLK's | (Valid | Coeffs) | | |
| ... | | | | | |
| N + 73 | | | | | |

The main function of the Run-level Decoder (RLD) 810 is to perform run level decoding. The present example provides a function enable bit, rlden (run level decoder enable), which is received from a CHD sub-block. The RLD will perform run level decoding when the rlden bit is set, and the RLD will decode tokens (i.e., run level tokens) from input block buffers. Otherwise, the RLD will be a pass-through device when the rlden is low. If rlden=1, then the data read from SRAM_A's MacroBlock Buffer is based on 21-bit token format, which is defined in the table below. If rlden=0, then the data read from SRAM_A's MacroBlock Buffer is based on 16-bit 2's compliment number. However, only 12 bits might pass through to the IQ or ISD if the datapath supports only 12 bits.

If the MacroBlock type is 8×8 block coding (which is defined in the command of MB header), the coded block pattern (cbp) determines whether the block is coded. If the MacroBlock type is not 8×8 block coding, the commands of Y0Y1_BLK_Coding, Y2Y3_BLK_Coding, or UV_BLK_Coding determine the block coding type and which sub-blocks are coded.

The first token of the Y0/Y1/Y2/Y3/U/V blocks are generally in the fixed locations of: N+2, N+14, N+26, N+38, N+50, and N+62, respectively, no matter whether other blocks are coded. The RLD only decodes the block if it is coded. If the block is not coded, the RLD will skip the block and jump to the next coded block. If none of the blocks is coded, then the RLD 810 might be bypassed altogether via path 822. In other words, the tokens (i.e., run/level coeff. token and End of Block (EOB) token) appear only if the block is coded. The coefficients are continuously within a sub-block (wherein the sub-block unit is either 8×8, 8×4, 4×8, or a 4×4).

Note that a "normal" token (or token coefficient) is defined as the number of zero coefficients (i.e., "run") in the token, followed by a signed coefficient (i.e., "Level"). In the case of the EOB token, it indicates that there are no more coefficients in the block, in which case the remainder of the coefficients in the block (i.e., those for which no value has yet been decoded) shall be set to zero.

TABLE 6

Format of Run/Level Token.

| Command | Binary Pattern<br>X_bin.code_value (21<br>bits) | Bit Field Description |
|---|---|---|
| Token_Coeff | 0_00_RRRRRR_LLLL<br>LLLLLLLL | 17:12(RRRR) represents the RUN: the number of zeros; 11:0(LLLL) represents the LEVEL: is a 2's compl. Coefficient |
| EOB | 0_10_x xxxx xxxx xxxx<br>xxxx x | End of Block |

Representative pseudocode for the run level decoding process is shown in Appendix A.

The main function of the Inverse Scan Decoder (ISD) 830 is to perform inverse scan decoding. There is a function enable bit, isden (inverse scan decoder enable), which is received from the CHD sub-block. When isden is set, the ISD will perform inverse scan decoding according to the scan pattern type and block coding type. Otherwise, the IDS will be pass through when isden bit is low.

The output of the RLD will generally be denoted by QFS[n], where n is in the range from 0 to (block_size−1). The one-dimensional data of QFS[n] is converted into a two-dimensional array of coefficients denoted by QF[v][u], where u and v both lie in the range 0 to 7. FIGS. 10, 11, and 12 show examples of three pre-defined scan patterns, identified via the parameter "scan_type." Note that the ReOrder Ram 804 not only behaves as the output buffers of the RLD and De-quantization sub-blocks, but also performs the inverse scan reordering. The writing order of the Reorder RAM is controlled by the parameter "scan_type." The reading order of the Reorder RAM is controlled by a parameter "reorder_rdir." In the present implementation, the Reorder RAM might consist of two 64×12 signal port RAM elements and behave like a Ping-Pong buffer. The input and output data rate of the Reorder RAM is 1 coefficient per clock. The information of a Reorder RAM generally contains one block, where the size of the block is either 8×8, 8×4, 4×8, or 4×4 data, and generally the data comprising coefficients.

In general, the inverse scan is a process equivalent to the following (for 0-5 scan types):

for (v=0; v<vertical_dimension_width; v++) // where vertical dimension width is either 4 or 8 for (u=0; u<horizontal_dimension_width; u++) // where horizontal dim. width is 4 or 8 QF[v][u]=QFS[scan[scan_type][v][u]]; // where scan_type=0 through 5

FIG. 10 shows a ZigZag scan pattern, represented as scan_type=0, with the definition shown of scan [0][v][u]. FIG. 11 shows an Alternative-Vertical scan pattern, represented as scan_type=1, with the definition shown of scan [1][v][u]. FIG. 12 shows an Alternate-Horizontal scan pattern, represented as scan_type=2, with the definition shown of scan [2][v][u]. FIG. 13 shows a Row order Scan Pattern, represented as scan_type=4, with the definition shown of scan [4][v][u]. FIG. 14 shows a Column order Scan Pattern, represented as scan_type=5, with the definition shown of scan [5][v][u].

The ISD is flexible and can support other scan patterns. This flexible support is facilitated by using a Scan Pattern RAM. A representative size for the Scan Pattern RAM is 144×6 bits, and the Scan Pattern RAM is partitioned into 4 regions, as shown in Table 7 below.

TABLE 7

Scan Pattern Ram partitioning.

| Scan Pattern RAM - Address Locations | Information Contained |
|---|---|
| 0-63 | scan pattern for 8×8 block size |
| 64-95 | scan pattern for 8×4 block size |
| 96-127 | scan pattern for 4×8 block size |
| 128-143 | scan pattern for 4×4 block size |

The data in the Scan Pattern RAM is downloadable from SRAM_A through the SA bus. When the CHD block decodes a "load scan pattern" command (see Table 1), it generates a SA memory request to the DMA/Bridge interface block (see FIG. 9). When data arrives at the input block buffer, it signals that the ISD block is ready to receive the new pattern from the input block buffer to the Scan Pattern RAM, according to the block size.

The scan pattern beginning from SRAM_A[a] is written in sequential order to a parameter Scan_Pattern_RAM. The address mapping between the data received order and the Scan Pattern RAM can be depicted via the following example, for a block size=8×8:

Scan_Pattern_RAM[0]=SRAM_A[a][127:120], Scan_Pattern_RAM[1]=SRAM_A[a][119:112], . . . Scan_Pattern_RAM[15]=SRAM_A[a][7:0], Scan_Pattern_RAM[16]=SRAM_A[a+1][127:120], . . . Scan_Pattern_RAM[31]=SRAM_A[a+1][7:0], and finally Scan_Pattern_RAM[63]=SRAM_A[a+3][7:0].

The address mapping between Scan_Pattern_RAM and QF[v][u] can be represented by the following pseudocode:

```
for (n=0, n < block_size n++) {
    v = Scan_pattern_RAM[n]/horizontal_dimension_width;
    u = Scan_pattern_RAM[n] MOD horizontal_dimension_width;
    QF[v][u] = QFS[n];
}
```

When using a ZigZag pattern as an example, the address mapping becomes:

scan_pattern_ram[0]=0, scan_pattern_ram[1]=1, scan_pattern ram[2]=8, scan_pattern_ram[3]=16, scan_pattern_ram[4]=9, scan pattern_ram[5]=3, scan_pattern_ram[6]=10, scan_pattern_ram[7]=17, scan pattern_ram[8]=24, . . .

scan_pattern_ram[63]=63.

The main function of the De-Quantization (DeQ) block 820 is to perform inverse quantization. The DeQ consists of multipliers and adders. An enable bit, i.e., deqen (DeQuantization Unit enable), is received from the CHD sub-block 806. When deqen is set, the DeQ will perform inverse quantization according to the quantization type and block coding type. Otherwise the DeQ will pass-through when the deqen bit is low, via the bypass path 824.

Certain symbols will be defined as follows to describe certain inverse quantization methods that can be handled by the present invention. Other such methods could be described and implemented, using similar conventions. The definitions are as follows:

QF[v][u]: the data at the output of the ISD.

F[v][u]: the output of inverse quantization (DeQ).

/: integer division with truncation of the result toward zero. For example: 7/4 is truncated to 1; −7/4 or 7/−4 are truncated to −1.

Sign( ): sign(x)=1 if x>0;
sign(x)=−1 if x<0;
sign(x)=0 if x=0.

quantizer_scale=Qscale_RAM[qscale_type*32+quantizer_scale_factor]; where Qscale_RAM is defined in Table 9 below.

dc_scale=dc_scale_luma for luminance blocks; // where dc_scale_luma is defined in the MB header.

=dc_scale_chroma for chrominance blocks; // where dc_scale_chroma is defined in the MB header.

According to such definitions, a first algorithmic method is shown in Appendix B-1 for inverse quantization of MPEG2, which is the first method of MPEG4. Appendix B-2 shows a second inverse quantization method for H263, which is the second method of MPEG4. Appendix B-3 shows a third inverse quantization method for MPEG1.

TABLE 8

Definition of data in the Q-matrix RAM.

| QRAM Address | Definition |
| --- | --- |
| 0-63 | Intra Luma Q-Matrix |
| 64-127 | Non-Intra Luma Q-Matrix |
| 128-191 | Intra Chroma Q-Matrix |
| 192-255 | Non-Intra Chroma Q-Matrix |

TABLE 9

Definitions of data in Qscale.

| Qscale RAM Address | Definition |
| --- | --- |
| 0-31 | Linear Qscale |
| 32-63 | Non-Linear Qscale |

Figure 15:
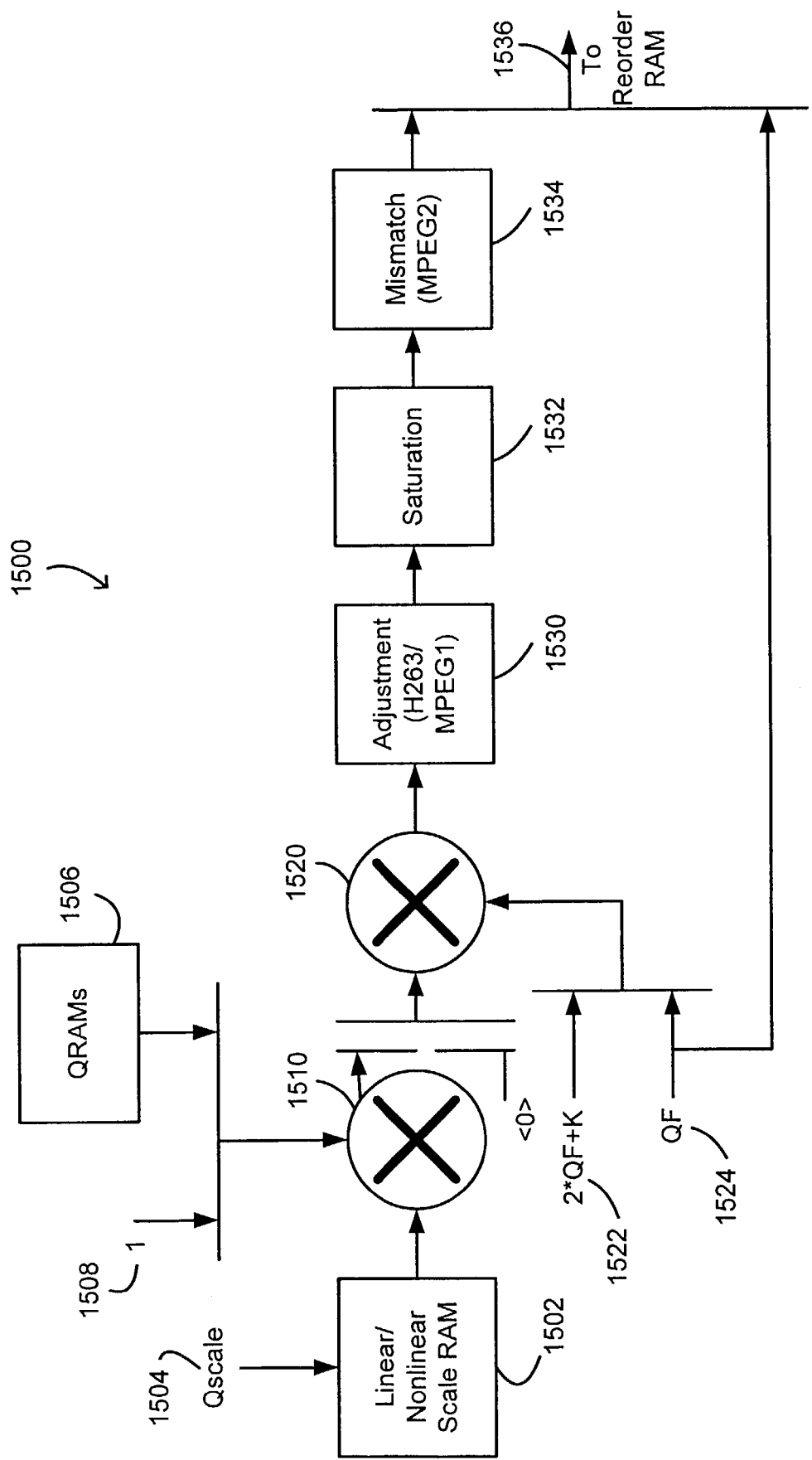
FIG. 15 is a block diagram, according to one aspect of the present invention, showing certain functional elements of the de-quantization device.

Referring now to FIG. 15, a functional block diagram 1500 is shown of the DeQ block 820. As a representative example, it can handle the three de-quantization algorithms described above. The second multiplier 1520 is designed as a 2's complement multiplier, since QF 1524 is a 2's compliment number. If there is a timing problem for the second multiplier 1520, the orders of multiplication can be rearranged so that the quantity (2*QF+K) 1522 is derived first and then multiplied with the Q-Matrix later. In this second case, both of the multipliers, 1510 and 1520, need to be designed for 2's compliment applications.

In the sequence header, the MIPS id depending upon the "load_intra_quantizer_matrix" and "load_non_intra_quantizer_matrix" bits to load either "user defined" or default (as defined by ISO/IEC 13818-2 SPEC) intra/non-intra quantizer matrices into SRAM_A. In the quantizer matrix extension, MIPS will update the Q-Matrix again if the "load_intra_quantizer_matrix" and/or "load_non_intra_quantizer_matrix" bits is set. After MIPS updates the matrices in the SRAM_A, the MIPS will write "load Qmatrix" commands with "Exe_cmd"="1111__00__00__00__1_xxx" to the command que. Thereafter the MIPS issues the iq_bgn to IQ, so that the IQ will load the Qmatrix from SRAM_A to QRAMs 1506. Either the QRAMs value or a "1" 1508 can be used by the multiplier 1510. Both of the input orders (or write orders) for the intra_quantizer_matrix and non_intra quantizer_matrix are in the default ZigZag scanning order (as described above for scan_type=0), and the output order (read order) is defined by scan_type.

The data in the Linear/Nonlinear Scale RAM 1502 are pre-loaded during an initialization stage. The loading scheme is similar to loading Qmatrix, except it uses "load linear Qscale" and/or "load non-linear Qscale" commands instead of "load Qmatrix" commands. The Qscale 1504 is shown being used by the Linear/Nonlinear Scale RAM 1502 (the Q-scale also being shown as 834 in FIG. 8).

After the two multipliers 1510 and 1520, block 1530 shows the Adjustment operation being performed, as per the H263 and MPEG1 inverse quantization methods. Thereafter, Saturation 1532 is performed (as per all of the example methods). Next, a mismatch operation 1534 is shown, which is performed for the MPEG2 inverse quantization method. Thereafter the result 1536 is sent to the Reorder RAM 804.

The data packing block 852 is used primarily for data packing from the output of the Reorder RAM to the Output Block buffer 855 via path 854. In general, each location of the Output Block buffer contains 8 coefficients. The data format is shown in Table 10.

TABLE 10

| | | Data Format of Output Block Buffer. | | | | | | |
| --- | --- | --- | --- | --- | --- | --- | --- | --- |
| Bit | <127:112> | <111:96> | <95:80> | <79:64> | <63:48> | <47:32> | <31:16> | <15:0> |
| Data | Coef 0 | Coef 1 | Coef 2 | Coef 3 | Coef 4 | Coef 5 | Coef 6 | Coef 7 |

In general, the Output Block Buffer consists of two 4×128 signal port RAMs and behaves as a Ping-Pong buffer. The IQ block will generate a memory request (SRAM_A memory write request) to the DMA/Bridge interface, when one of the following conditions is true: Either at least one of two Block buffers is full, or a block (4×8, 8×4, or 4×4 sub-block) has been completely filled within one of the buffers.

In the case of MPEG2 coding, the data packing 852 and the Output Block Buffer 855 are by-passed, since there is a direct path 850 from the output of the Reorder RAM 804 to the input of the IDCT. MPEG2 generally requires around 420 cycles to completely reconstruct a MacroBlock. In order to support HD high performance, and reduce the latency of IT, this direct output path has been provided from the IQ Reorder RAM to the IT.

In order to enhance the IDCT (or IT) output DMA transfer rate and reduce the logic, the data (the output of the IQ) to the IDCT is based on the "column" order, so that the output data from the IDCT will be in "row" ordering.

For example, if an 8×8 block, after inverse scan, is defined as shown in FIG. 16A, then the data after Inverse Quantization, as stored in the MacroBlock buffer, and before Inverse Transform, will be stored in "column" order, as per Table 11.

TABLE 11

MacroBlock in column order.

| N | MB | Header | /Block | Coding | info | | | |
|---|---|---|---|---|---|---|---|---|
| N + 1 | | | | | | | | |
| N + 2 | D0 | D8 | D16 | D24 | D32 | D40 | D48 | D56 |
| ... | D1 | D9 | ... | ... | | | | D57 |
| | ... | | | | | | | ... |
| N + 9 | D7 | D15 | D23 | D31 | D39 | D47 | D55 | D63 |
| N + 10 | | | | | | | | |
| N + 11 | | | | | | | | |
| N + 12 | | | | | | | | |
| N + 13 | | | | | | | | |

This facilitates the IDCT continuously reading data from N+2, N+3, ..., N+9 to process an 8×8 block of data without further delay. After 2-D Inverse Transform, the data will be stored back to the MacroBlock Buffer in "row" order, as shown by Table 12.

TABLE 12

MacroBlock stored in row order.

| N | MB | Header | /Block | Coding | info | | | |
|---|---|---|---|---|---|---|---|---|
| N + 1 | | | | | | | | |
| N + 2 | D1 | D1 | D2 | D3 | D4 | D5 | D6 | D7 |
| ... | D8 | D9 | ... | ... | | | | D15 |
| | ... | | | | | | | ... |
| N + 9 | D56 | D57 | D58 | D59 | D60 | D61 | D62 | D63 |
| N + 10 | | | | | | | | |
| N + 11 | | | | | | | | |
| N + 12 | | | | | | | | |
| N + 13 | | | | | | | | |

A second example consists of 2 8×4 blocks, after Inverse Scan, and is defined by FIG. 16B. The data stored in the MacroBlock Buffer, after Inverse Quantization, but before Inverse Transform, will be stored in "column" order as shown in Table 13.

TABLE 13

MacroBlock Buffer stored in column order.

| N | MB | Header | /Block | Coding | info | | | |
|---|---|---|---|---|---|---|---|---|
| N + 1 | | | | | | | | |
| N + 2 | D0 | D8 | D16 | D24 | D1 | D9 | D17 | D25 |
| N + 3 | D2 | D10 | D18 | D26 | D3 | D11 | D19 | D27 |
| N + 4 | D4 | D12 | D20 | D28 | D5 | D13 | D21 | D29 |
| N + 5 | D6 | D14 | D22 | D30 | D7 | D15 | D23 | D31 |
| N + 6 | | | | | | | | |
| N + 7 | | | | | | | | |
| N + 8 | D32 | D40 | D48 | D56 | D33 | D41 | D49 | D57 |
| N + 9 | D34 | D42 | D50 | D58 | D35 | D43 | D51 | D59 |
| N + 10 | D36 | D44 | D52 | D60 | D37 | D45 | D53 | D61 |
| N + 11 | D38 | D46 | D54 | D62 | D39 | D47 | D55 | D63 |
| N + 12 | | | | | | | | |
| N + 13 | | | | | | | | |

When stored in this manner, the IDCT can continuously read data from N+2 to N+5 to get the first 8×4 sub-block data to process without further delay or conversion. Similarly for reading N+8, N+9, ..., N+11 for the second sub-block (i.e., 8×4 sub-block). After the 2-D Inverse Transform, the data stored back to the MacroBlock Buffer will be stored in "row" order, in a continuous manner, as per Table 14.

TABLE 14

MacroBlock Buffer with data in row order.

| N | MB | Header | /Block | Coding | info | | | |
|---|---|---|---|---|---|---|---|---|
| N + 1 | | | | | | | | |
| N + 2 | D0 | D1 | D2 | D3 | D4 | D5 | D6 | D7 |
| N + 3 | D8 | D9 | D10 | D11 | D12 | D13 | D14 | D15 |
| N + 4 | D16 | D17 | D18 | D19 | D20 | D21 | D22 | D23 |
| N + 5 | D24 | D25 | D26 | D27 | D28 | D29 | D30 | D31 |
| N + 6 | D32 | D33 | D34 | D35 | D36 | D37 | D38 | D39 |
| N + 7 | D40 | D41 | D42 | D43 | D44 | D45 | D46 | D47 |
| N + 8 | D48 | D49 | D50 | D51 | D52 | D53 | D54 | D55 |
| N + 9 | D56 | D57 | D58 | D59 | D60 | D61 | D62 | D63 |
| N + 10 | | | | | | | | |
| N + 11 | | | | | | | | |
| N + 12 | | | | | | | | |
| N + 13 | | | | | | | | |

The IDCT can thereby continuously write data to N+2, N+3, ..., N+9 locations without further processing and/or delay.

A third example consists of a coded 4×8 sub-block, after Inverse Scan, which is defined by FIG. 16C. The data stored in the MacroBlock Buffer, after Inverse Quantization, but before Inverse Transform will be stored in "column" order, as shown by Table 15.

TABLE 15

MacroBlock data stored in column order.

| N | MB | Header | /Block | Coding | info | | | |
|---|---|---|---|---|---|---|---|---|
| N + 1 | | | | | | | | |
| N + 2 | | | | | | | | |
| N + 3 | No | Valid | Data | | | | | |
| N + 4 | | | | | | | | |
| N + 5 | | | | | | | | |
| N + 6 | | | | | | | | |
| N + 7 | | | | | | | | |
| N + 8 | D4 | D12 | D20 | D28 | D36 | D44 | D52 | D60 |
| N + 9 | D5 | D13 | D21 | D29 | D37 | D45 | D53 | D61 |
| N + 10 | D6 | D14 | D22 | D30 | D38 | D46 | D54 | D62 |
| N + 11 | D7 | D15 | D23 | D31 | D39 | D47 | D55 | D63 |
| N + 12 | | | | | | | | |
| N + 13 | | | | | | | | |

The IDCT can thereby continuously read data from N+8 to N+11 to get the coded 4×8 sub-block of data to process, without further delay or conversion. The IDCT module will generally skip to read/perform the first 4×8 sub-block since it is not a coded block. After the 2-D Inverse Transform, the data stored back to the MacroBlock buffer will be stored in "row" order, in a continuous manner, as per Table 16.

TABLE 16

MacroBlock Buffer data stored in row order.

| N | MB | Header | /Block | Coding | info | | | |
|---|---|---|---|---|---|---|---|---|
| N + 1 | | | | | | | | |
| N + 2 | 0 | 0 | 0 | 0 | D4 | D5 | D6 | D7 |
| N + 3 | 0 | 0 | 0 | 0 | D12 | D13 | D14 | D15 |
| N + 4 | 0 | 0 | 0 | 0 | D20 | D21 | D22 | D23 |
| N + 5 | 0 | 0 | 0 | 0 | D28 | D29 | D30 | D31 |
| N + 6 | 0 | 0 | 0 | 0 | D36 | D37 | D38 | D39 |
| N + 7 | 0 | 0 | 0 | 0 | D44 | D45 | D46 | D47 |
| N + 8 | 0 | 0 | 0 | 0 | D52 | D53 | D54 | D55 |
| N + 9 | 0 | 0 | 0 | 0 | D60 | D61 | D62 | D63 |
| N + 10 | | | | | | | | |
| N + 11 | | | | | | | | |
| N + 12 | | | | | | | | |
| N + 13 | | | | | | | | |

The IDCT can thereby continuously write data to N+2, N+3, . . . , N+9 locations without further processing and/or delay. The IDCT will first fill "0's" for the not coded blocks, and then write the data back to the MacroBlock Buffer.

A fourth example consists of 2 coded 4×4 blocks and 2 non-coded 4×4 blocks. After inverse scan, this block is defined by FIG. 16D. The data stored in the MacroBlock Buffer, after Inverse Quantization, but before Inverse Transform, will be stored in "column" order, per Table 17.

TABLE 17

MacroBlock Buffer data stored in column order.

| N | MB | Header | /Block | Coding | info | | | |
|---|---|---|---|---|---|---|---|---|
| N + 1 | | | | | | | | |
| N + 2 | D0 | D8 | D16 | D24 | D1 | D9 | D17 | D25 |
| N + 3 | D2 | D10 | D18 | D26 | D3 | D11 | D19 | D27 |
| N + 4 | | | | | | | | |
| N + 5 | D4 | D12 | D20 | D28 | D5 | D13 | D21 | D29 |
| N + 6 | D6 | D14 | D22 | D30 | D7 | D15 | D23 | D31 |
| N + 7 | | | | | | | | |
| N + 8 | No | Valid | Data | | | | | |
| N + 9 | | | | | | | | |
| N + 10 | | | | | | | | |
| N + 11 | No | Valid | Data | | | | | |
| N + 12 | | | | | | | | |
| N + 13 | | | | | | | | |

The IDCT can thereby continuously read data from N+2, N+3, and so forth, to get the first 4×4 sub-block data to process without further delay and/or conversion. A similar result occurs for reading N+5 and N+6 for the second 4×4 sub-block. After 2-D Inverse Transform, the data stored back to the MacroBlock Buffer will be stored in "row" order, in a continuous manner, as per Table 18.

TABLE 18

MacroBlock data stored in row order.

| N | MB | Header | /Block | Coding | info | | | |
|---|---|---|---|---|---|---|---|---|
| N + 1 | | | | | | | | |
| N + 2 | D0 | D1 | D2 | D3 | D4 | D5 | D6 | D7 |
| N + 3 | D8 | D9 | D10 | D11 | D12 | D13 | D14 | D15 |
| N + 4 | D16 | D17 | D18 | D19 | D20 | D21 | D22 | D23 |
| N + 5 | D24 | D25 | D26 | D27 | D28 | D29 | D30 | D31 |
| N + 6 | 0 | 0 | 0 | 0 | 0 | 0 | 0 | 0 |
| N + 7 | 0 | 0 | 0 | 0 | 0 | 0 | 0 | 0 |
| N + 8 | 0 | 0 | 0 | 0 | 0 | 0 | 0 | 0 |
| N + 9 | 0 | 0 | 0 | 0 | 0 | 0 | 0 | 0 |
| N + 10 | | | | | | | | |
| N + 11 | | | | | | | | |
| N + 12 | | | | | | | | |
| N + 13 | | | | | | | | |

The IDCT can thereby continuously write data to N+2, N+3, . . . , N+9 locations without further processing and delay.

Although certain exemplary embodiments of the present invention have been described, it should not be construed to limit the scope of the appended claims. For example, the present invention can be implemented by either a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive. It is therefore intended that the following claims be interpreted as covering all such alterations and modifications as fall within the true spirit and scope of the invention.

The invention claimed is:

1. An inverse quantizer apparatus for processing macroblocks of data, the apparatus having modular operation elements that can be selectably invoked to accommodate different coding standards, the apparatus comprising:
   a memory area having table entries corresponding to the modular operation elements;
   a modular operation including a decoder device, whereby the decoder device is selectably invoked via accessing the associated decoder device table entry;
   a modular operation including an inverse scan device, whereby the scan device is selectably invoked via accessing the associated scan device table entry;
   a modular operation, including a de-quantizer device, wherein the de-quantizer device is selectably invoked via accessing the associated de-quantizer device table entry; and
   at least one modular operation, including a processing operation that can be invoked between other modular operations, where the processing operation is selectably invoked via accessing the associated processing operation table entry.

2. The inverse quantizer apparatus of claim 1, wherein the modular operations are invoked via accessing commands stored in the memory area.

3. The inverse quantizer apparatus of claim 1, wherein the table entries are pre-loaded into the memory area.

4. The inverse quantizer apparatus of claim 3, wherein the inverse quantizer apparatus is invoked and the appropriate table will be referenced at the appropriate point in completing the inverse quantizer operation.

5. The inverse quantizer apparatus of claim 1, wherein the table entries are loaded via a separate command stored in the memory area.

6. The inverse quantizer apparatus of claim 1, wherein different table entries are loaded depending upon the coding standard being used.

7. The inverse quantizer apparatus of claim 6, wherein the tables are updated at the macroblock level, whereby the tables can be readily changed according to different coding standards.

8. The inverse quantizer apparatus of claim 1, wherein the memory storage area includes an SRAM device.

9. The inverse quantizer apparatus of claim 1, wherein the decoder device is a run level decoder.

10. The inverse quantizer apparatus of claim 1, wherein certain modular operations can be selectably bypassed.

11. An inverse quantizer apparatus for processing macroblocks of data, the apparatus having modular operation elements that can be selectably invoked to accommodate different coding standards, the apparatus comprising:
   a memory area having table entry means corresponding to the modular operation elements;
   a first modular operation element including a decoder device;
   a second modular operation element including an inverse scan device;
   a third modular operation element including a de-quantizer device; and
   at least one additional modular operation element including a processing operation that can be invoked between other modular operations,
   wherein the modular operations are invoked via a selectable means for accessing the table entry means.

* * * * *